(12) United States Patent
Krah

(10) Patent No.: US 11,086,463 B2
(45) Date of Patent: Aug. 10, 2021

(54) MULTI MODAL TOUCH CONTROLLER

(71) Applicant: Apple Inc., Cupertino, CA (US)

(72) Inventor: Christoph H. Krah, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/134,651

(22) Filed: Sep. 18, 2018

(65) Prior Publication Data

US 2019/0102004 A1 Apr. 4, 2019

Related U.S. Application Data

(60) Provisional application No. 62/566,210, filed on Sep. 29, 2017.

(51) Int. Cl.
*G06F 3/044* (2006.01)
*G06F 3/041* (2006.01)
*G06F 1/16* (2006.01)

(52) U.S. Cl.
CPC .......... *G06F 3/0446* (2019.05); *G06F 1/1643* (2013.01); *G06F 3/0412* (2013.01); *G06F 3/041662* (2019.05); *G06F 2203/0381* (2013.01)

(58) Field of Classification Search
CPC ...... G06F 3/044; G06F 3/0412; G06F 3/0416; G06F 2203/0381
See application file for complete search history.

(56) References Cited

U.S. PATENT DOCUMENTS

| | | |
|---|---|---|
| 3,656,065 A | 4/1972 | Reinhard et al. |
| 3,984,757 A | 10/1976 | Gott |
| 3,988,669 A | 10/1976 | Fasching |
| 4,149,231 A | 4/1979 | Bukosky |
| 5,041,817 A | 8/1991 | Reeb |
| 5,095,224 A | 3/1992 | Renger |
| 5,173,685 A | 12/1992 | Nimmo |

(Continued)

FOREIGN PATENT DOCUMENTS

| | | |
|---|---|---|
| CN | 102003612 A | 4/2011 |
| EP | 2131202 A1 | 9/2009 |

(Continued)

OTHER PUBLICATIONS

International Search Report dated Oct. 27, 2017, for PCT Application No. PCT/US2017/044545, six pages.

(Continued)

*Primary Examiner* — Alexander Eisen
*Assistant Examiner* — Nathaniel P Brittingham
(74) *Attorney, Agent, or Firm* — Kubota & Basol LLP

(57) ABSTRACT

A multi-modal touch controller configured to operate in different modes. In some examples, the multi-modal touch controller can be operated in a first mode corresponding to a guarded self-capacitance scan. In some examples, the multi-modal touch controller can be operated in a second mode corresponding to offset-compensated mutual capacitance scan. In some examples, the multi-modal controller can be operated in a third mode corresponding to a mutual and self-capacitance scan. The multi-modal touch controller can advantageously allow one touch sensing chipset to be used across different types of guarded touch sensor panels and across different modes of operation.

25 Claims, 14 Drawing Sheets

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,127,899 A | 10/2000 | Silva et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,373,474 B1 | 4/2002 | Katabami |
| 6,429,700 B1 | 8/2002 | Yang |
| 6,690,387 B2 | 2/2004 | Zimmerman et al. |
| 7,015,894 B2 | 3/2006 | Morohoshi |
| 7,151,417 B1 | 12/2006 | Suzuki |
| 7,184,064 B2 | 2/2007 | Zimmerman et al. |
| 7,211,966 B2 | 5/2007 | Green et al. |
| 7,288,945 B2 | 10/2007 | Martinez et al. |
| 7,525,348 B1 | 4/2009 | Ziazadeh |
| 7,589,596 B2 | 9/2009 | Masuda et al. |
| 7,663,607 B2 | 2/2010 | Hotelling et al. |
| 7,961,055 B2 | 6/2011 | Miyata et al. |
| 7,986,194 B2 | 7/2011 | Kiyohara et al. |
| 8,149,002 B2 | 4/2012 | Ossart et al. |
| 8,222,885 B2 | 7/2012 | Kirchmeier et al. |
| 8,436,687 B2 | 5/2013 | Aruga et al. |
| 8,479,122 B2 | 7/2013 | Hotelling et al. |
| 8,917,256 B2 | 12/2014 | Roziere |
| 8,933,710 B2 | 1/2015 | Blondin et al. |
| 8,963,372 B2 | 2/2015 | Takano et al. |
| 9,151,792 B1 | 10/2015 | Kremin et al. |
| 9,401,697 B2 | 7/2016 | Blondin et al. |
| 10,120,520 B2 | 11/2018 | Krah |
| 10,459,587 B2 | 10/2019 | Krah et al. |
| 2004/0125918 A1 | 7/2004 | Shanmugavel et al. |
| 2005/0030683 A1 | 2/2005 | Tailliet |
| 2005/0146377 A1 | 7/2005 | Owen |
| 2005/0162408 A1 | 7/2005 | Martchovsky |
| 2006/0197753 A1 | 9/2006 | Hotelling |
| 2006/0202714 A1 | 9/2006 | Hoang et al. |
| 2006/0203403 A1 | 9/2006 | Schediwy et al. |
| 2008/0231292 A1 | 9/2008 | Ossart |
| 2008/0246511 A1 | 10/2008 | Miura |
| 2009/0027937 A1 | 1/2009 | Kirchmeier |
| 2009/0294816 A1 | 12/2009 | Park et al. |
| 2010/0135051 A1 | 6/2010 | Mallwitz |
| 2010/0292945 A1 | 11/2010 | Reynolds et al. |
| 2011/0050256 A1 | 3/2011 | Frangen |
| 2011/0133788 A1 | 6/2011 | Liu |
| 2011/0193848 A1 | 8/2011 | Kojima |
| 2011/0279409 A1 | 11/2011 | Salaverry et al. |
| 2012/0155086 A1 | 6/2012 | Shimonishi et al. |
| 2013/0021294 A1 | 1/2013 | Maharyta et al. |
| 2013/0285971 A1 | 10/2013 | Elias et al. |
| 2013/0323942 A1 | 12/2013 | Blondin |
| 2014/0103712 A1 | 4/2014 | Blondin |
| 2014/0125357 A1 | 5/2014 | Blondin et al. |
| 2014/0145732 A1 | 5/2014 | Blondin et al. |
| 2015/0035768 A1 | 2/2015 | Shahparnia et al. |
| 2015/0035787 A1 | 2/2015 | Shahparnia et al. |
| 2015/0035797 A1 | 2/2015 | Shahparnia |
| 2015/0091850 A1 | 4/2015 | Morein et al. |
| 2015/0091851 A1 | 4/2015 | Reynolds |
| 2015/0338958 A1 | 11/2015 | Decaro et al. |
| 2016/0034102 A1 | 2/2016 | Roziere et al. |
| 2016/0117017 A1 | 4/2016 | Kremin et al. |
| 2016/0177385 A1 | 6/2016 | Fife et al. |
| 2016/0195977 A1 | 7/2016 | Reynolds et al. |
| 2017/0003779 A1* | 1/2017 | Reynolds ................ G06F 3/044 |
| 2017/0068352 A1 | 3/2017 | Blondin et al. |
| 2017/0075495 A1 | 3/2017 | Roberson et al. |
| 2017/0090615 A1 | 3/2017 | Bohannon et al. |
| 2017/0108978 A1 | 4/2017 | Blondin et al. |
| 2017/0262121 A1* | 9/2017 | Kurasawa ............ G02F 1/13338 |
| 2017/0285859 A1 | 10/2017 | Shepelev et al. |
| 2017/0315650 A1 | 11/2017 | Reynolds |
| 2018/0032176 A1* | 2/2018 | Krah ...................... G06F 3/044 |
| 2018/0074633 A1 | 3/2018 | Kida et al. |
| 2018/0107309 A1 | 4/2018 | Endo et al. |
| 2019/0073061 A1 | 3/2019 | Krah |
| 2019/0102004 A1* | 4/2019 | Krah ..................... G06F 1/1643 |
| 2019/0102037 A1* | 4/2019 | Krah ..................... G06F 3/0416 |
| 2020/0019265 A1 | 1/2020 | Krah et al. |
| 2020/0103992 A1 | 4/2020 | Sauer et al. |

FOREIGN PATENT DOCUMENTS

| | | |
|---|---|---|
| FR | 2693555 A1 | 1/1994 |
| FR | 2756048 A1 | 5/1998 |
| FR | 2893711 A1 | 5/2007 |
| JP | H-04-015516 A | 1/1992 |
| JP | 9-280806 A | 10/1997 |
| JP | 11-304942 A | 11/1999 |
| JP | 11-304942 A | 11/1999 |
| JP | 2000-132319 A | 5/2000 |
| JP | 2000-163031 A | 6/2000 |
| JP | 2002-342033 A | 11/2002 |
| JP | 2011-053212 A | 3/2011 |
| KR | 10-2007-0042178 A | 4/2007 |
| KR | 10-2014-0043395 A | 4/2014 |
| WO | 2007/058727 A1 | 5/2007 |
| WO | WO-2007/060324 A1 | 5/2007 |
| WO | WO-2012/172240 A1 | 12/2012 |
| WO | WO-2012/172241 A1 | 12/2012 |
| WO | 2015/017196 A1 | 2/2015 |
| WO | WO-2018/023089 A1 | 2/2018 |
| WO | 2019067267 A1 | 4/2019 |
| WO | 2019067268 A1 | 4/2019 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Notice of Allowance dated Jul. 5, 2018, for U.S. Appl. No. 15/663,271, filed Jul. 28, 2017, ten pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report dated Jan. 7, 2019, for PCT Application No. PCT/US2018/051587, five pages.

International Search Report dated Jan. 11, 2019, for PCT Application No. PCT/US2018/051588, five pages.

Non-Final Office Action dated Dec. 13, 2018, for U.S. Appl. No. 16/179,565, filed Nov. 2, 2018 nine pages.

Final Office Action received for U.S. Appl. No. 16/134,604, dated Jul. 8, 2020, 18 pages.

Non-Final Office Action received for U.S. Appl. No. 16/530,938, dated Jun. 29, 2020, 15 pages.

Notice of Allowance received for U.S. Appl. No. 16/581,721, dated Apr. 22, 2020, 5 pages.

International Search Report received for PCT Patent Application No. PCT/US2018/051587, dated Jan. 7, 2019, 3 pages.

International Search Report received for PCT Patent Application No. PCT/US2018/051588, dated Jan. 11, 2019, 3 pages.

Non-Final Office Action received for U.S. Appl. No. 16/581,721, dated Oct. 30, 2019, 10 pages.

Non-Final Office Action received for U.S. Appl. No. 16/134,604, dated Dec. 26, 2019, 16 pages.

Notice of Allowance received for U.S. Appl. No. 16/179,565, dated Jun. 6, 2019, 7 pages.

(56) References Cited

OTHER PUBLICATIONS

Notice of Allowance received for U.S. Appl. No. 16/581,721, dated Aug. 4, 2020, 5 pages.

* cited by examiner

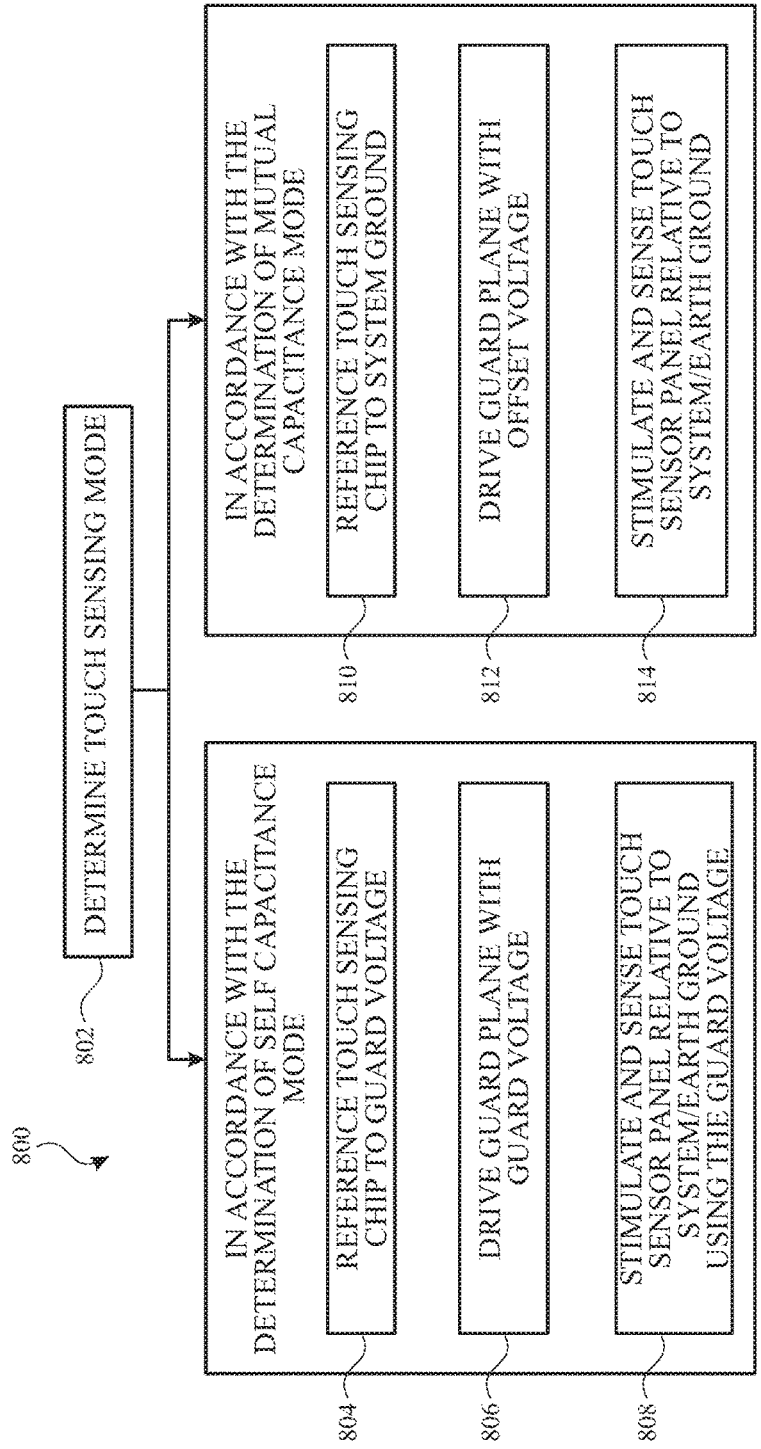

| SCAN MODE | SPA | MC + SC SCANS N STEPS |
|---|---|---|
| TOUCH SENSING CHIP REFERENCE VOLTAGE | SYSTEM GND | $V_{GUARD}$ |
| GUARD PLANE VOLTAGE | SYSTEM GND | $V_{OFFSET} + V_{GUARD}$ |
| STIMULUS VOLTAGE | - | $V_{GUARD} + V_{STIM}$ |

MULTI MODAL TOUCH CONTROLLER

CROSS REFERENCE FOR RELATED APPLICATION

This application claims the benefit under 35 U.S.C. 119(e) of U.S. Provisional Patent Application No. 62/566,210, filed Sep. 29, 2017 the contents of which are incorporated herein by reference in their entirety for all purposes.

FIELD OF THE DISCLOSURE

This relates generally to touch sensing, and more particularly to touch sensing with a multi-modal touch controller.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

In some cases, parasitic or stray capacitances can exist between the touch electrodes used for sensing touch on the touch sensor panels, and other components of the devices in which the touch sensor panels are included, which can be referenced to a chassis or earth ground. These parasitic or stray capacitances can introduce errors and/or offsets into the touch outputs of the touch sensor panels. Therefore, it can be beneficial to reduce or eliminate such parasitic or stray capacitances.

SUMMARY OF THE DISCLOSURE

This relates to a multi-modal touch controller configured to operate in different modes. In some examples, the multi-modal touch controller can be operated in a first mode corresponding to a guarded self-capacitance scan. In some examples, the multi-modal touch controller can be operated in a second mode corresponding to offset-compensated mutual capacitance scan. In some examples, the multi-modal controller can be operated in a third mode corresponding to a mutual and self-capacitance scan. The multi-modal touch controller can advantageously allow one touch sensing chipset to be used across different types of guarded touch sensor panels and across different modes of operation.

BRIEF DESCRIPTION OF THE DRAWINGS

FIG. 8A illustrates an exemplary scan plan and corresponding configurations for the multi-modal touch controller according to examples of the disclosure.

FIG. 8B describes a process of touch sensing using a multi-modal touch controller according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to a multi-modal touch controller configured to operate in different modes. In some examples, the multi-modal touch controller can be operated in a first mode corresponding to a guarded self-capacitance scan. In some examples, the multi-modal touch controller can be operated in a second mode corresponding to offset-compensated mutual capacitance scan. In some examples, the multi-modal controller can be operated in a third mode corresponding to a mutual and self-capacitance scan. The multi-modal touch controller can advantageously allow one touch sensing chipset to be used across different types of guarded touch sensor panels and across different modes of operation.

Figure 1A:
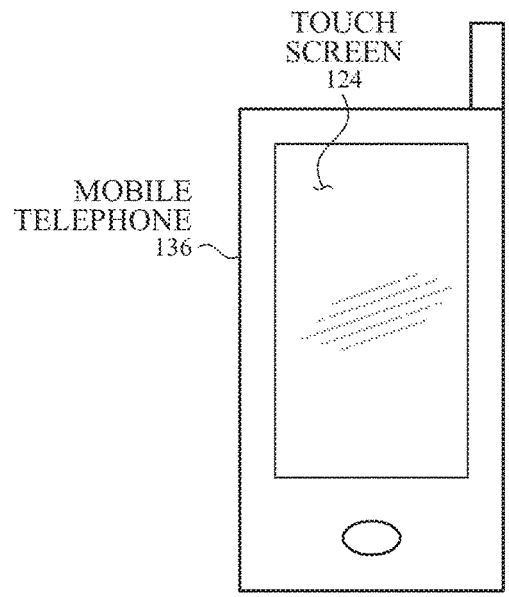
FIGS. 1A-1D illustrate an example mobile telephone, an example media player, an example personal computer and an example tablet computer that can each include an exemplary touch screen according to examples of the disclosure.
Figure 1B:
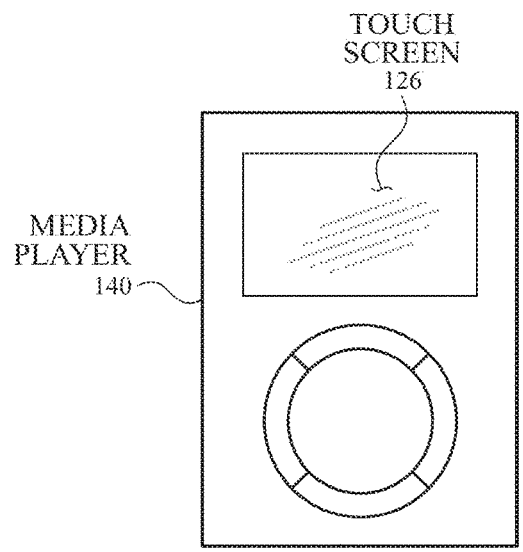
Figure 1C:
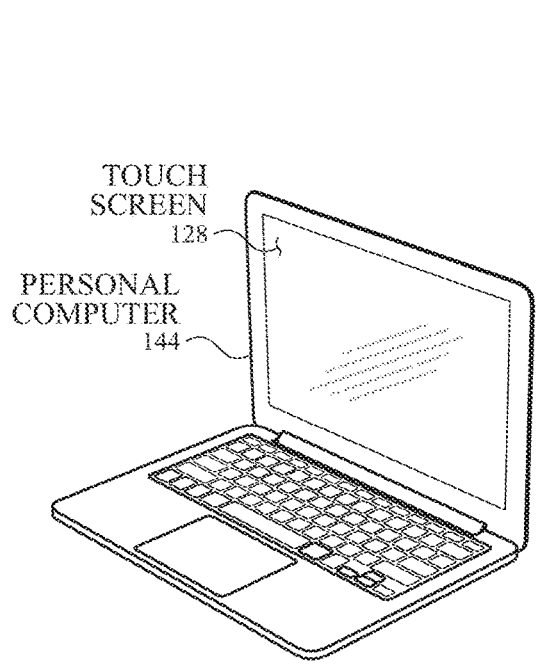
Figure 1D:
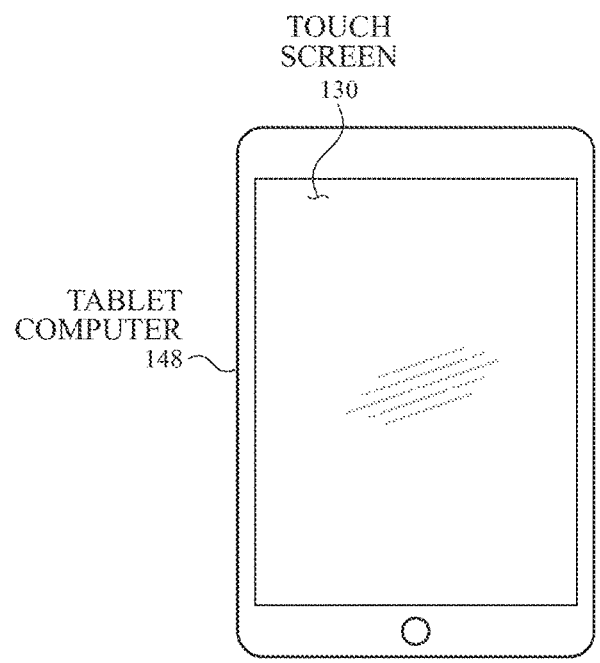

FIGS. 1A-1D illustrate example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. FIG. 1D illustrates an example tablet computer 148 that includes a touch screen 130. It is understood that the above touch screens can be implemented in other devices as well, including in wearable devices. Additionally it should be understood that the disclosure herein is not limited to touch screens, but applies as well to touch sensor panels without a corresponding display.

In some examples, touch screens 124, 126, 128 and 130 can be based on self-capacitance. A self-capacitance based touch system can include a matrix of small, individual plates of conductive material that can be referred to as touch node electrodes (as described below with reference to touch screen 220 in FIG. 2 and with reference to touch screen 402 in FIG. 4B). For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the electrodes of a self-capacitance based touch system can be formed from rows and columns of conductive material (as described below with reference to touch screen 400 in FIG. 4A), and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128 and 130 can be based on mutual capacitance. A mutual capacitance based touch system can include drive and sense lines that may cross over each other on different layers, or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. In some examples, the electrodes of a mutual-capacitance based touch system can be formed from a matrix of small, individual plates of conductive material, and changes in the mutual capacitance between plates of conductive material can be detected, similar to above.

In some examples, touch screens 124, 126, 128 and 130 can be based on mutual capacitance and/or self-capacitance. The electrodes can be arrange as a matrix of small, individual plates of conductive material (e.g., as in touch screen 402 in FIG. 4B) or as drive lines and sense lines (e.g., as in touch screen 400 in FIG. 4B), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
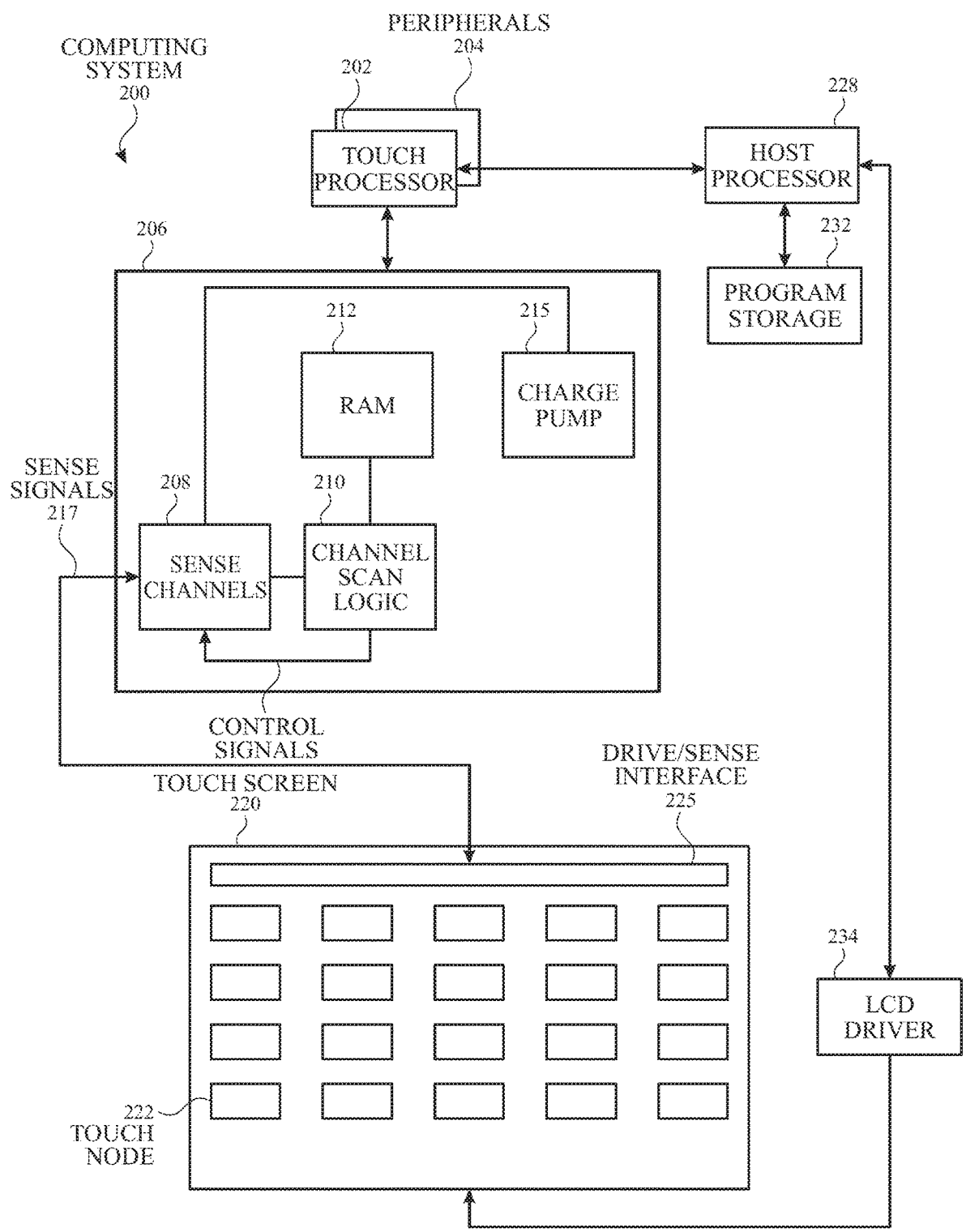
FIG. 2 is a block diagram of an example computing system that illustrates one implementation of an example self-capacitance touch screen according to examples of the disclosure.

FIG. 2 is a block diagram of an example computing system 200 that illustrates one implementation of an example self-capacitance touch screen 220 according to examples of the disclosure. It is understood that computing system 200 can instead include a mutual capacitance touch screen, as described above, though the examples of the disclosure will be described assuming a self-capacitance touch screen is provided. Computing system 200 can be included in, for example, mobile telephone 136, digital media player 140, personal computer 144, tablet computer 148, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch nodes of touch screen 220, as described in more detail below. In some examples, touch controller 206, touch processor 202 and peripherals 204 can be integrated into a single application specific integrated circuit (ASIC), and in some examples can be integrated with touch screen 220 itself. As described in more detail below, in some examples the sense channel and/or other components of touch controller 206 and touch processor 202 can be implemented across multiple power domains. Additionally, as described in more detail below, in some examples a multi-modal touch controller can be configurable to operate with different types of touch sensor panels (e.g., row/column and pixelated) and for different touch sensing modes (e.g., mutual and/or self-capacitance).

Touch screen 220 can be used to derive touch information at multiple discrete locations of the touch screen, referred to herein as touch nodes. For example, touch screen 220 can include touch sensing circuitry that can include a capacitive sensing medium having a plurality of electrically isolated touch node electrodes 222 (e.g., a pixelated self-capacitance touch screen). Touch node electrodes 222 can be coupled to sense channels 208 in touch controller 206, can be driven by stimulation signals from the sense channels through drive/sense interface 225, and can be sensed by the sense channels through the drive/sense interface as well, as described above. As used herein, an electrical component "coupled to" or "connected to" another electrical component encompasses a direct or indirect connection providing electrical path for communication or operation between the coupled components. Thus, for example, touch node electrodes 222 may be directly connected to sense channels or indirectly connected to sense channels via drive/sense interface 225, but in either case provided an electrical path for driving and/or sensing the touch node electrodes 222. Labeling the conductive plates used to detect touch (i.e., touch node electrodes 222) as "touch node" electrodes can be particularly useful when touch screen 220 is viewed as capturing an "image" of touch (e.g., a "touch image"). In other words, after touch controller 206 has determined an amount of touch detected at each touch node electrode 222 in touch screen 220, the pattern of touch node electrodes in the touch screen at which a touch occurred can be thought of as a touch image (e.g., a pattern of fingers touching the touch screen). In such examples, each touch node electrode in a pixelated self-capacitance touch screen can be sensed for the corresponding touch node represented in the touch image.

Computing system 200 can also include a host processor 228 for receiving outputs from touch processor 202 and performing actions based on the outputs. For example, host processor 228 can be connected to program storage 232 and a display controller, such as an LCD driver 234 (or an LED display or OLED display driver). The LCD driver 234 can provide voltages on select (e.g., gate) lines to each pixel transistor and can provide data signals along data lines to these same transistors to control the pixel display image as described in more detail below. Host processor 228 can use LCD driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3A:
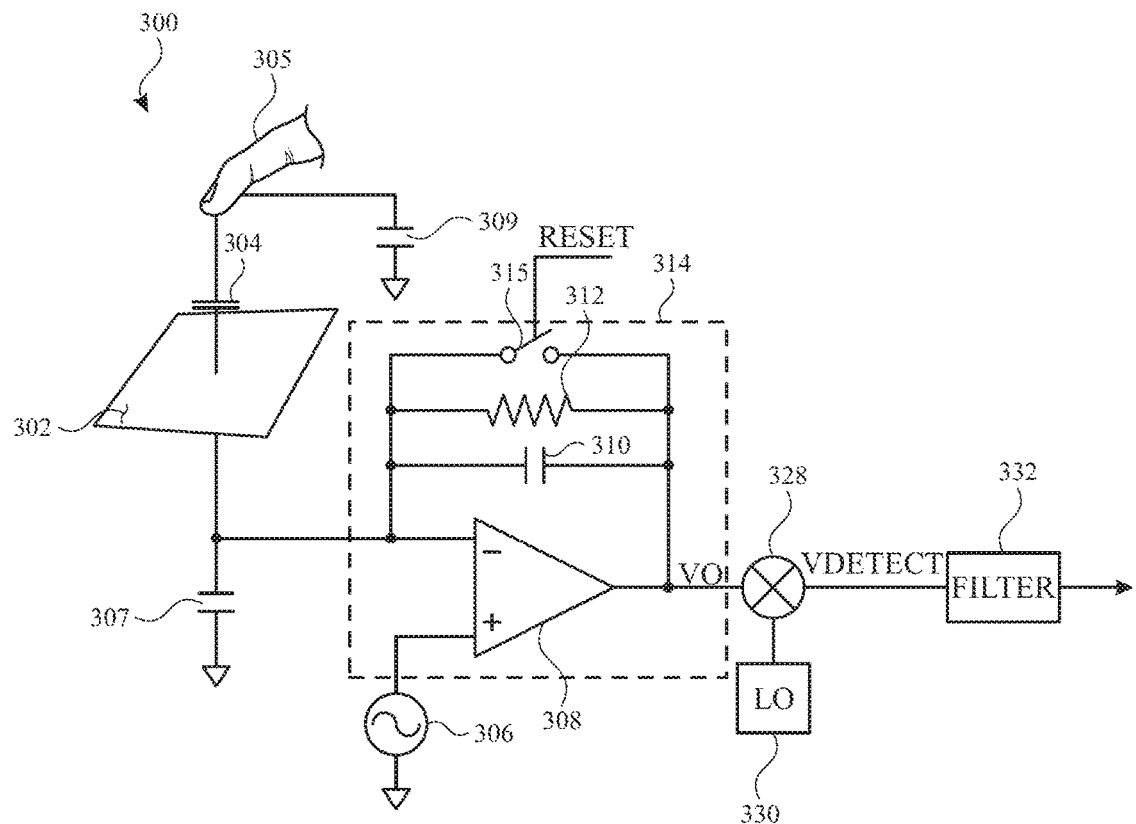
FIG. 3A illustrates an exemplary touch sensor circuit corresponding to a self-capacitance sensing electrode and sensing circuit according to examples of the disclosure.

FIG. 3A illustrates an exemplary touch sensor circuit 300 corresponding to a self-capacitance touch node electrode 302 and sensing circuit 314 according to examples of the disclosure. Touch node electrode 302 can correspond to touch node electrode 222. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
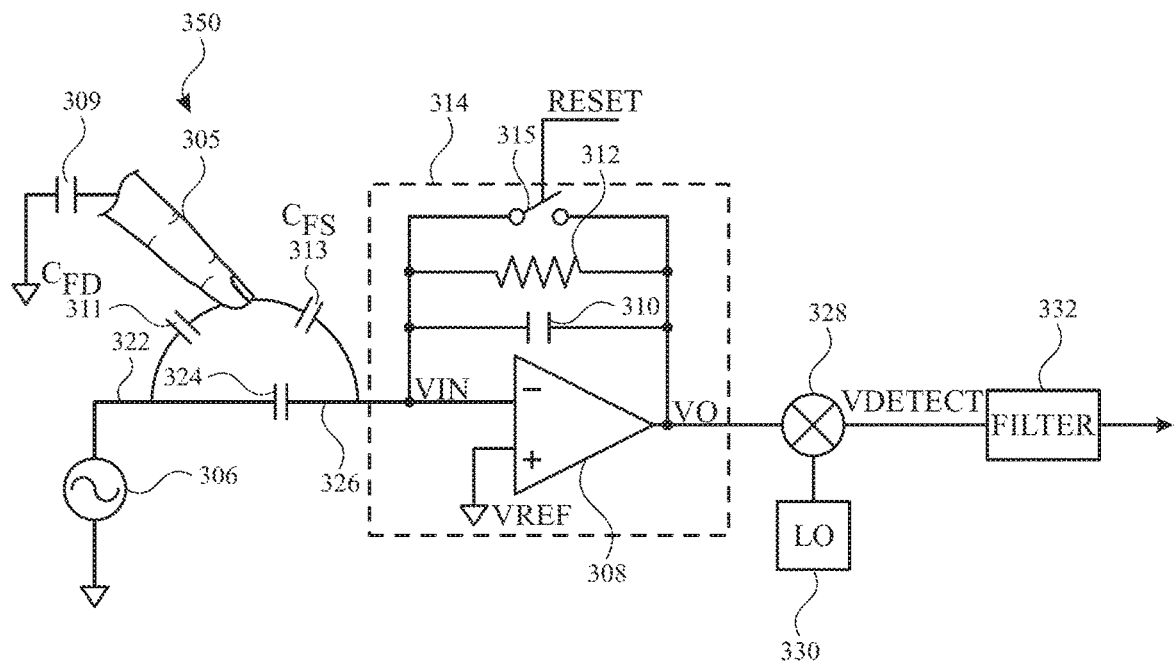
FIG. 3B illustrates an exemplary touch sensor circuit corresponding to a mutual-capacitance drive and sense line and sensing circuit according to examples of the disclosure.

FIG. 3B illustrates an exemplary touch sensor circuit 350 corresponding to a mutual-capacitance drive line 322 and sense line 326 and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can be altered. This change in mutual capacitance 324 can be detected to indicate a touch or proximity event at the touch node, as described previously and below. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred.

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
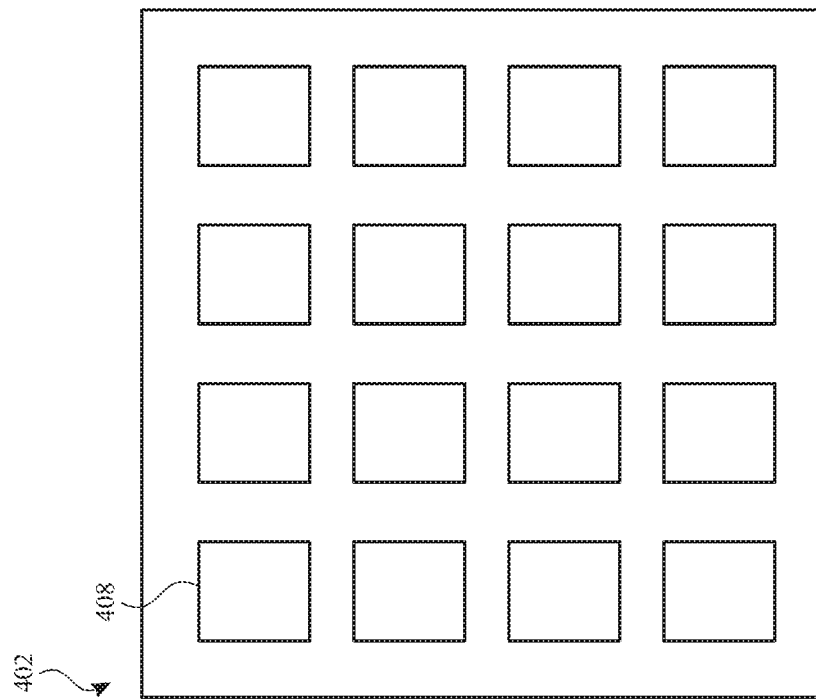
FIG. 4B illustrates a touch screen with sensing electrodes arranged in a pixelated sensing electrode configuration according to examples of the disclosure.
Figure 4A:
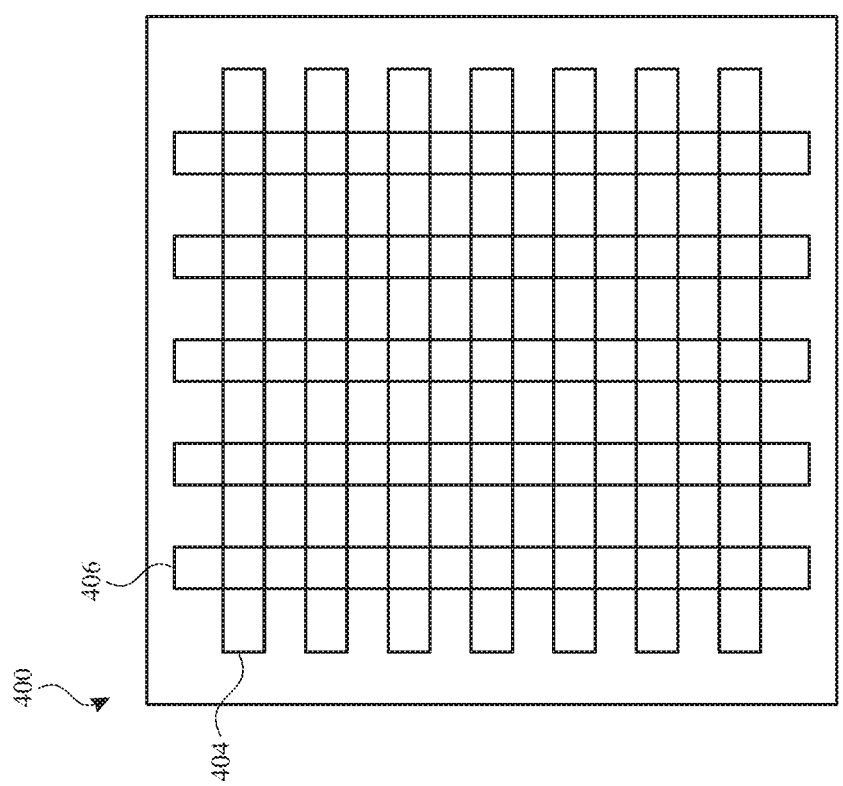
FIG. 4A illustrates a touch screen with sensing electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 400. In some examples, touch screen 400 can sense the self-capacitance of touch node electrodes 408 to detect touch and/or proximity activity on touch screen 400, and in some examples, touch screen 400 can sense the mutual capacitance between touch node electrodes 408 to detect touch and/or proximity activity on touch screen 400.

In some examples, the touch sensing circuitry of a touch screen or touch sensor panel (e.g., touch sensing circuitry as described with reference to FIGS. 2 and 3A-3B) can be fabricated in an electronic chip (e.g., an integrated circuit, etc.), and the electronic chip and/or the circuitry included in the electronic chip can operate with respect to a reference voltage provided by the chassis of the electronic device ("chassis ground") in which the touch screen or touch sensor panel is included (e.g., devices 136, 140, 144 and 148 in FIGS. 1A-1D). In some examples this chassis ground can be a grounding pathway from the chassis through a user operating the electronic device to earth ground. In some examples, this chassis ground can be the same as earth ground. However, in some examples, operating the electronic chip and/or the circuitry included in the electronic chip with respect to chassis or earth ground can result in undesirable touch sensing performance, as will be described in more detail below.

Figure 5A:
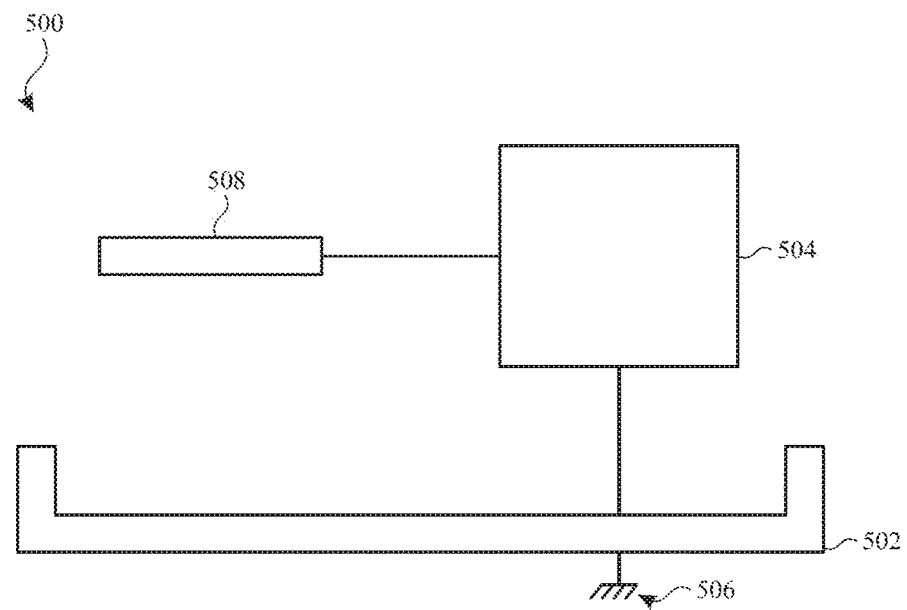
FIGS. 5A-5B illustrate an exemplary touch sensor panel configuration in which the touch sensing circuitry of the touch sensor panel is included in an electronic chip (e.g., an integrated circuit, etc.) that is referenced to earth or chassis ground according to examples of the disclosure.
Figure 5B:
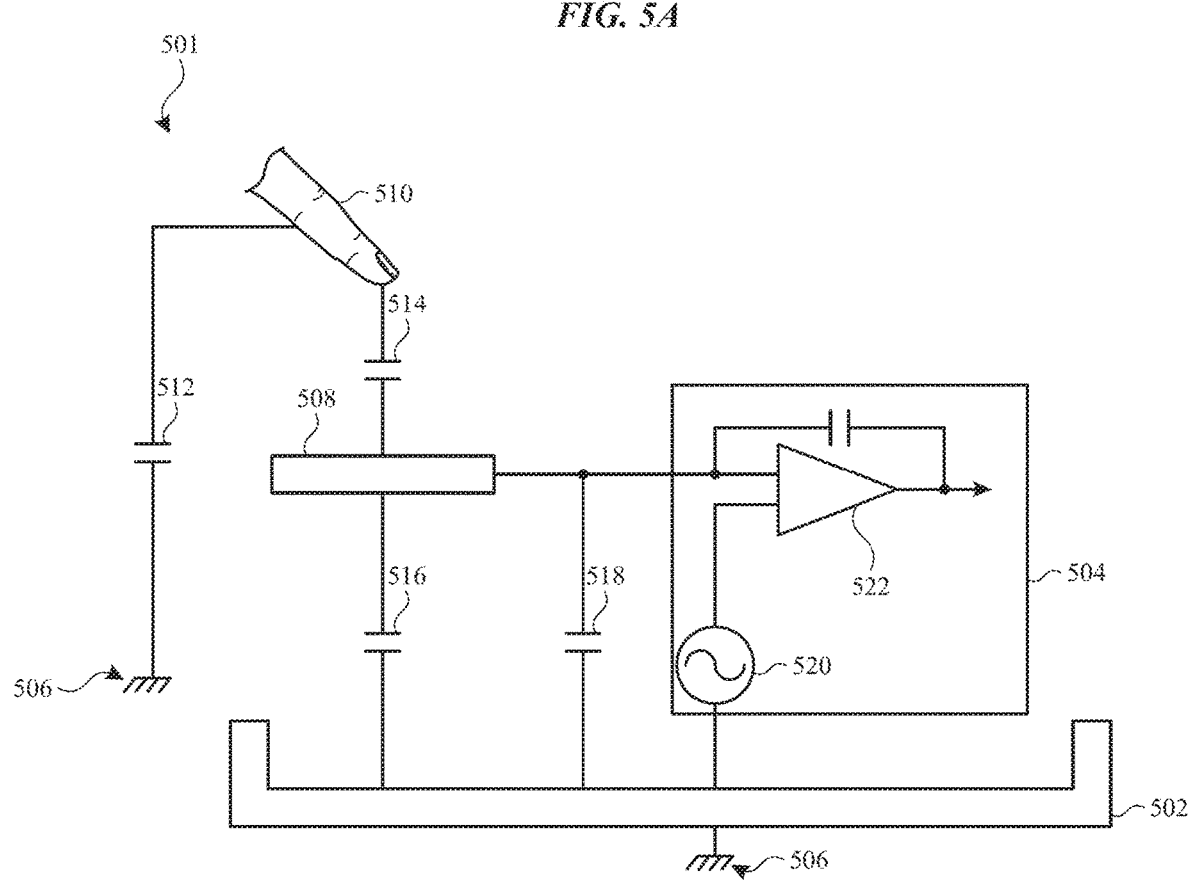

FIGS. 5A-5B illustrate an exemplary touch sensor panel configuration 500 in which the touch sensing circuitry of the touch sensor panel is included in an electronic chip (e.g., an integrated circuit, etc.) that is referenced to earth or chassis ground according to examples of the disclosure. Specifically, in configuration 500 of FIG. 5A, a touch sensor panel is included in a device (e.g., devices 136, 140, 144 and 148 in FIGS. 1A-1D) having device chassis 502. Chassis 502 can be grounded to earth ground 506, or can be grounded to a separate device ground (not illustrated). Chassis 502 can include electronic chip 504, which can include touch sensing circuitry for sensing touch on the touch sensor panel included in the device of FIG. 5A. For example, chip 504 can include touch controller 206 and/or touch processor 202 of FIG. 2 and/or the touch sensing circuits of FIGS. 3A-3B. Chip 504 and/or the touch sensing circuitry in chip 504 can be referenced to chassis 502 (e.g., referenced to earth ground 506). Chip 504 can be coupled, via one or more traces, to touch node electrode 508, which can be a touch node electrode included in the touch sensor panel of the device of FIG. 5A. Chip 504 can also be coupled to other touch node electrodes included in the touch sensor panel, though a single touch node electrode 508 is illustrated for ease of description. Chip 504 can measure the self-capacitance of touch node electrode 508 to detect proximity activity at touch node electrode 508, as discussed with reference to FIG. 3A.

FIG. 5B illustrates various capacitances associated with proximity detection using touch sensor panel configuration 500 of FIG. 5A according to examples of the disclosure. Specifically, finger (or object) 510 can be in proximity to touch node electrode 508. Finger 510 can be grounded to earth ground 506 through capacitance 512 (e.g., $C_{body}$), which can represent a capacitance from finger 510 through a user's body to earth ground 506. Capacitance 514 (e.g., $C_{touch}$) can represent a capacitance between finger 510 and touch node electrode 508, and can be the capacitance of interest in determining how close finger 510 is to touch node electrode 508. Capacitance 514 can be measured by sense circuitry 522 (e.g., as described with reference to FIG. 3A) included in chip 504 to determine an amount of touch at touch node electrode 508. However, because touch node electrode 508 can be included in chassis 502, which can be grounded to earth ground 506, parasitic or stray capacitances can exist between touch node electrode 508 and chassis 502 (represented by capacitance 516 (e.g., $C_p$)) and/or between traces that connect touch node electrode 508 to sense circuitry 522 and chassis 502 (represented by capacitance 518 (e.g., $C_s$)). These parasitic or stray capacitances 516 and 518 can also be measured by sense circuitry 522, and can create an offset (e.g., from zero output signal) in the output signal of sense circuitry 522, which can reduce the signal to noise ratio and/or the dynamic range of sense circuitry 522. This, in turn, can reduce the range of touch-related capacitances (e.g., $C_{touch}$ 514) that sense circuitry 522 can detect, thus potentially limiting the touch sensing performance of the touch sensor panel in which touch node electrode 508 is included.

In order to reduce or eliminate parasitic or stray capacitances that may be measured by sense circuitry in a touch sensing chip of a touch sensor panel, a guard plane can be established between the touch-related components of the touch sensor panel (e.g., touch node electrode 508, touch sensing chip 504, etc.) and chassis 502. The guard plane, including the touch sensing chip (e.g., integrated circuit, etc.), can be referenced to a guard potential that can mirror or be the same as the stimulation signal used to stimulate the touch node electrodes on the touch sensor panel. In this way, the voltages on both sides of the above-described parasitic or stray capacitances can mirror each other, causing those capacitances to fall out of the touch sensing measurements performed by the touch sensing circuitry in the touch sensing chip. As a result, the signal portion (out of sense amplifier 522) associated with the undesired stray capacitances can be largely reduced, therefore improving the touch dynamic range and the touch sensing performance of the touch sensor panel. It should be understood that "guard plane" need not refer to a planar element or electrode; rather, the guard planes of the disclosure can be implemented in any number of manners, including being non-planar, being composed of one or more portions of the device that are driven/maintained at a guard potential, and being implemented in different ways in different parts of the device (e.g., as part of a flex circuit in one portion of the device, as part of the touch sensor panel in another portion of the device, etc.).

Figure 6A:
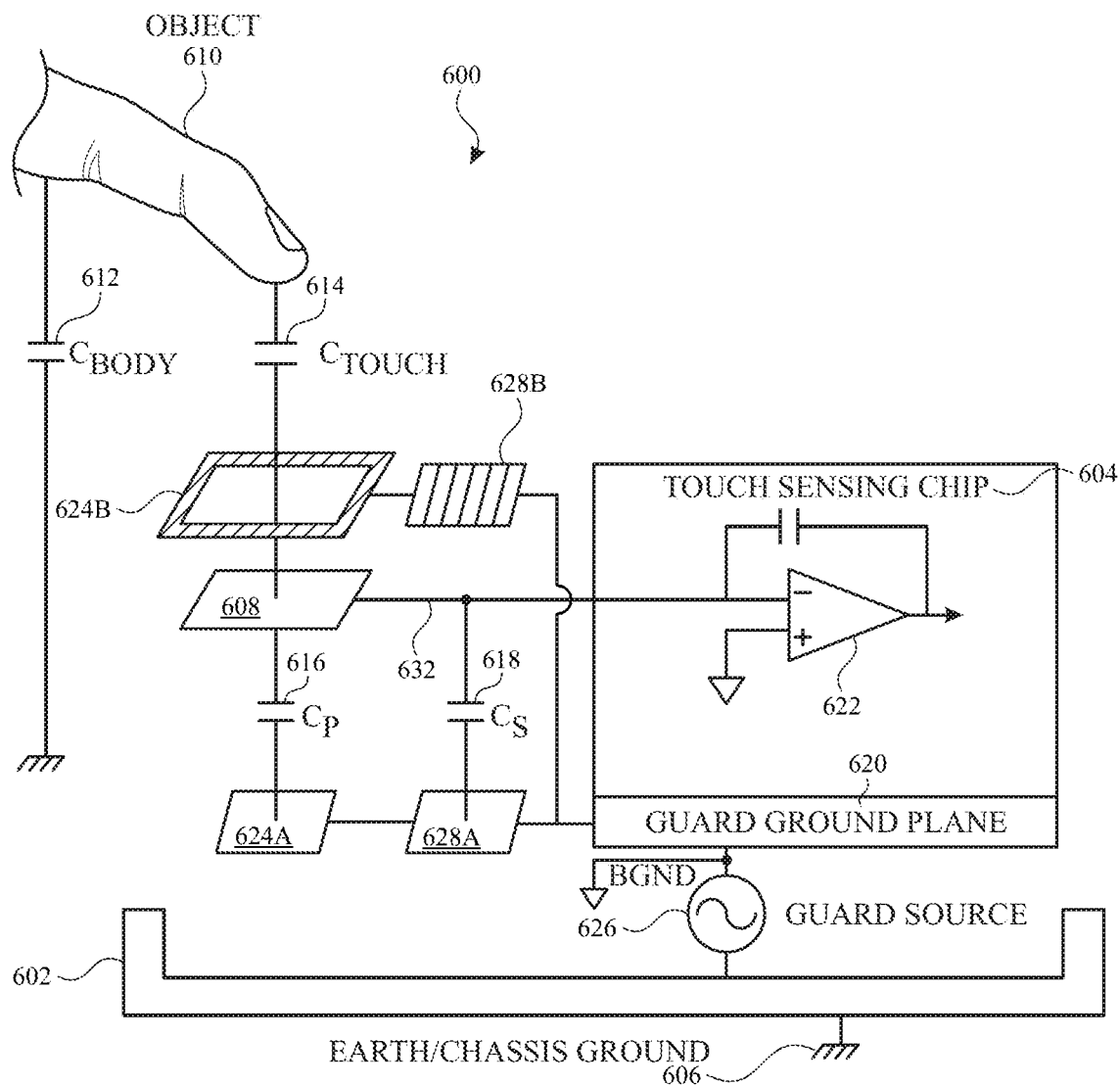
FIG. 6A illustrates an exemplary touch sensor panel configuration including various capacitances associated with exemplary touch sensor panel configuration according to examples of the disclosure.

FIG. 6A illustrates an exemplary touch sensor panel configuration 600 including various capacitances associated with exemplary touch sensor panel configuration 600 according to examples of the disclosure. In the configuration of FIG. 6A, the touch sensing circuitry of the touch sensor panel is included on an electronic chip (e.g., an integrated circuit, etc.) that is referenced to a guard ground rather than a chassis or earth ground. Specifically, in configuration 600 of FIG. 6A, touch sensing circuitry in touch sensing chip 604 (also referred to herein as "touch controller") can be coupled to touch node electrodes in a touch sensor panel by routing traces. As a representative example, touch node electrode 608 in FIG. 6A can be coupled to touch sensing circuitry 622 by routing trace 632. The routing traces can be included on a flex circuit that couples touch sensing chip 604 to touch sensor panel. Touch sensing chip 604 can be disposed or fabricated on guard plane 620, which can represent a virtual ground plane of touch sensing chip 604 that is different from chassis or earth ground 606. In particular, stimulation source 626 ("guard source") can be referenced to chassis or earth ground 606, and can output a guard voltage (e.g., a guard stimulation signal, such as a square wave) that can establish the voltage at guard plane 620. In this manner, the guard plane 620 can be referenced to the guard voltage, acting as a guard ground for touch sensing chip 604. Stimulation source 626 can be included on a chip, separate from touch sensing chip 604. Because touch sensing chip 604 can be built on guard plane 620, the circuitry (e.g., touch sensing circuitry) included in touch sensing chip 604 can be referenced to the guard signal, and can be isolated from chassis or earth ground 606 by guard plane 620. In other words, touch sensing chip 604 and the chip in which guard source 626 is included can operate in different "power domains": touch sensing chip 604 can operate in the guard power domain, and guard source 626 can operate in the chassis or earth power domain. Guard plane 620 can be any conductive material on which touch sensing chip 604 can be disposed or fabricated (e.g., silver, copper, gold, etc.). For example, touch sensing chip 604 may be assembled on a flex circuit or printed circuit board (PCB), and may be referenced to the flex circuit or PCB ground layer 620 driven by guard source 626. Guard source can be implemented, for example, using a waveform generator (e.g., generating arbitrary waveforms, such as a square wave, and can be referenced to earth ground 606) whose output can be inputted in to a digital-to-analog converter (DAC). Analog output from the DAC can be provided to a linear buffer (e.g., with unity or some other gain) whose output can correspond to the output of guard source 626.

Additionally, a guard plane 624A can be disposed between touch node electrode 608 and chassis 602 (or, more generally, earth ground 606), and guard plane 628A can be disposed between routing traces that couple touch node electrode 608 to touch sensing chip 604 and chassis 602 (or, more generally, earth ground 606). Guard plane 624A and guard plane 628A can also be stimulated by the same guard voltage as is guard plane 620. These guard planes 624A and 628A can similarly isolate touch node electrode 608 and traces that couple touch node electrode 608 to touch sensing chip 604 from chassis or earth ground 606. One or more of guard planes 620, 624 and 628 can reduce or eliminate parasitic or stray capacitances that may exist between touch node electrode 608 and chassis or earth ground 606, as will be described below. Optionally guard plane 624B and guard plane 628B, both referenced to the same guard voltage, can be disposed on an opposite side of touch node electrode 608 and routing trace 632. For example, a flex circuit including routing (e.g., routing trace 632) between the touch sensing chip 604 and touch node electrodes (e.g., touch node electrode 608) can include guard plane 628B on top of routing trace 632 and guard plane 628A on bottom of routing trace 632 to sandwich trace 632 on both sides. The touch sensor panel can also include a guard plane 624A and guard plane 624B sandwiching touch node electrode 608 (and similar for other touch node electrodes in the touch sensor panel). Guard plane 624B can include openings corresponding to touch node electrodes to enable detection of touch activity on the touch sensor panel (or proximity activity) while guarding the routing in the touch sensor panel from stray capacitances that can form due to a touch or other stray capacitances. In some examples, the top and/or bottom guard planes can be positioned completely or partially between one or more touch node electrodes and one or more noise sources, such as a display. This configuration (locating the guard plane(s) between the touch node electrodes and noise source) can provide a shielding effect by receiving capacitively coupled noise and shunting the charge away from the touch node electrodes (providing noise isolation between the display and touch node electrodes). In some examples, the top and/or bottom guard planes can be driven by a guard voltage. In this configuration, with the guard planes and the touch node electrodes driven with the same signals or signals referenced to each other (e.g., at the same frequency, phase and amplitude), parasitic capacitive coupling between the guard plane(s) and the touch node electrodes can be minimized, which further shields the touch node electrodes from capacitively coupled noise. Similarly, while an "interrogated" touch node electrode (e.g., a touch node electrode being driven and sensed in the D/S configuration) is being sensed to determine the occurrence of a touch, other "non-interrogated" touch node electrodes (in the D configuration) can be driven with the same guard signal as the guard plane(s). In this configuration, the interrogated electrode can be surrounded by other touch node electrodes that can also be acting as a shield for the interrogated touch node electrode. As each touch node electrode is interrogated in one or more steps, the guard voltage can be selectively applied to other non-interrogated electrodes. In some examples, the material(s) out of which guard planes 628A-B are made in the flex circuit can be different than the material(s) out of which guard planes 624A-B are made in touch sensor panel 630. For example, guard planes 624A-B in touch sensor panel can be made of the same material that touch node electrodes 608 are made of (e.g., ITO, or another fully or partially transparent conductor), and guard planes 628A-B in the flex circuit can be made of a different conductor, such as copper, aluminum, or other conductor that may or may not be transparent.

Various capacitances associated with touch and/or proximity detection using touch sensor panel configuration 600 are also shown in FIG. 6A. Specifically, an object 610 (e.g., a finger) can be in proximity to touch node electrode 608. Object 610 can be grounded to earth ground 606 through capacitance 612 (e.g., $C_{body}$), which can represent a capacitance from object 610 through a user's body to earth ground 606. Capacitance 614 (e.g., $C_{touch}$) can represent a capacitance between object 610 and touch node electrode 608, and can be the capacitance of interest in determining how close object 610 is to touch node electrode 608. Typically, $C_{body}$ 612 can be significantly larger than $C_{touch}$ 614 such that the equivalent series capacitance seen at touch node electrode 608 through object 610 can be approximately $C_{touch}$ 614. Capacitance 614 can be measured by touch sensing circuitry 622 (e.g., as described with reference to FIG. 3A) included in touch sensing chip 604 to determine an amount of touch at touch node electrode 608 based on the sensed touch signal. As shown in FIG. 6A, touch sensing circuitry 622 can be referenced to guard ground. Although illustrated with the non-inverting input of the sense amplifier coupled to the guard ground, in some example, additional bias voltage referenced to guard ground (not shown) can be included. In some examples, capacitance 616 (e.g., $C_p$) can be a parasitic capacitance between one or more touch node electrodes 608 and guard plane 624A. Capacitance 618 (e.g., $C_s$) can be a stray capacitance between routing trace 632 coupled to touch node electrode 608 and guard plane 628, for example. In some examples, the impact of capacitances 616 and 618 on a sensed touch signal can be mitigated because guard planes 624A and 628A and touch sensing circuitry 622 are all coupled to the virtual ground signal produced by guard source 626.

When guarded, the voltage at touch node electrode 608 and trace 632 can mirror or follow the voltage at guard planes 624A and 628A, and thereby capacitances 616 and 618 can be reduced or eliminated from the touch measurements performed by touch sensing circuitry 622. Without stray capacitances 616 and 618 affecting the touch measurements performed by touch sensing circuitry 622, the offset in the output signal of sense circuitry 622 (e.g., when no touch is detected at touch node electrode 608) can be greatly reduced or eliminated, which can increase the signal to noise ratio and/or the dynamic range of sense circuitry 622. This, in turn, can improve the ability of touch sensing circuitry 622 to detect a greater range of touch at touch node electrode 608, and to accurately detect smaller capacitances $C_{touch}$ 614 (and, thus, to accurately detect proximity activity at touch node electrode 608 at larger distances). Additionally, with a near-zero offset output signal from touch sensing circuitry 622, the effects of drift due to environmental changes (e.g., temperature changes) can be greatly reduced. For example, if the signal out of sense amplifier 622 consumes 50% of its dynamic range due to undesirable/un-guarded stray capacitances in the system, and the analog front end (AFE) gain changes by 10% due to temperature, the sense amplifier 622 output may drift by 5% and the effective signal-to-noise ratio (SNR) can be limited to 26 dB. By reducing the undesirable/un-guarded stray capacitances by 20 dB, the effective SNR can be improved from 26 dB to 46 dB.

Figure 6B:
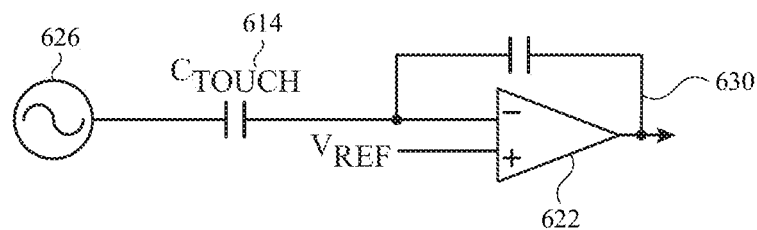
FIG. 6B illustrates an exemplary equivalent circuit diagram of an exemplary touch sensor panel configuration according to examples of the disclosure.

FIG. 6B illustrates an exemplary equivalent circuit diagram of an exemplary touch sensor panel configuration 630 according to examples of the disclosure. As described herein, guarding can reduce or eliminate capacitances 616 and 618 from the touch measurements performed by touch sensing circuitry 622. As a result, the sense amplifier 622 can simply detect $C_{touch}$ 614, which can appear as a virtual mutual capacitance between object 610 and touch node electrode 608. Specifically, object 610 can appear to be stimulated (e.g., via $C_{body}$ 612) by guard source 626, and object 610 can have $C_{touch}$ 614 between it and the inverting input of sense circuitry 622. Changes in $C_{touch}$ 614 can, therefore, be sensed by sense circuitry 622 as changes in the virtual mutual capacitance $C_{touch}$ 614 between object 610 and sense circuitry 622 (e.g., as described with reference to sense circuitry 314 in FIG. 3B). As such, the offset in the output signal of sense circuitry 622 (e.g., when no touch is detected at touch node electrode 608) can be greatly reduced or eliminated, as described above. As a result, sense circuitry 622 (e.g., the input stage of sense circuitry 622) need not support as great a dynamic input range that self-capacitance sense circuitry (e.g., sense circuitry 314 in FIG. 3A) might otherwise need to support in circumstances/configurations that do not exhibit the virtual mutual capacitance effect described here.

Because the self-capacitance measurements of touch node electrodes in self-capacitance based touch screen configurations can exhibit the virtual mutual capacitance characteristics described above, in some examples, touch sensing chip 604 need not be a chip designed to support self-capacitance measurements (e.g., touch sensing chip 604 may not include sense circuitry 314 as described in FIG. 3A). Instead, touch sensing chip 604 may be a mutual capacitance touch sensing chip designed to support mutual capacitance measurements (e.g., touch sensing chip 604 may include sense circuitry 314 as described in FIG. 3B, but not sense circuitry 314 as described in FIG. 3A). In such examples, guard source 626 can be appropriately designed and used with the mutual capacitance touch sensing chip in various configurations of this disclosure (e.g., configuration 600) to effectively achieve the guarded self-capacitance functionality of this disclosure despite touch sensing chip 604 being designed as a mutual capacitance touch sensing chip, rather than as a self-capacitance touch sensing chip. For example, referring to FIG. 3B, stimulation source 306 (e.g., guard source 626) can stimulate the guard plane(s) of the disclosure, which can act as the drive electrodes in the virtual mutual capacitance configuration described here. The touch node electrodes of the touch sensor panel can then, in turn, be treated as the sense electrodes in the virtual mutual capacitance configuration described here, and can be coupled to the input of sense amplifier 308 in FIG. 3B. Touch sensing circuitry 314 in FIG. 3B can then sense the mutual capacitance between the guard plane(s) and the touch node electrodes, which can be represented by the circuit configuration of FIG. 6B.

Figure 7A:
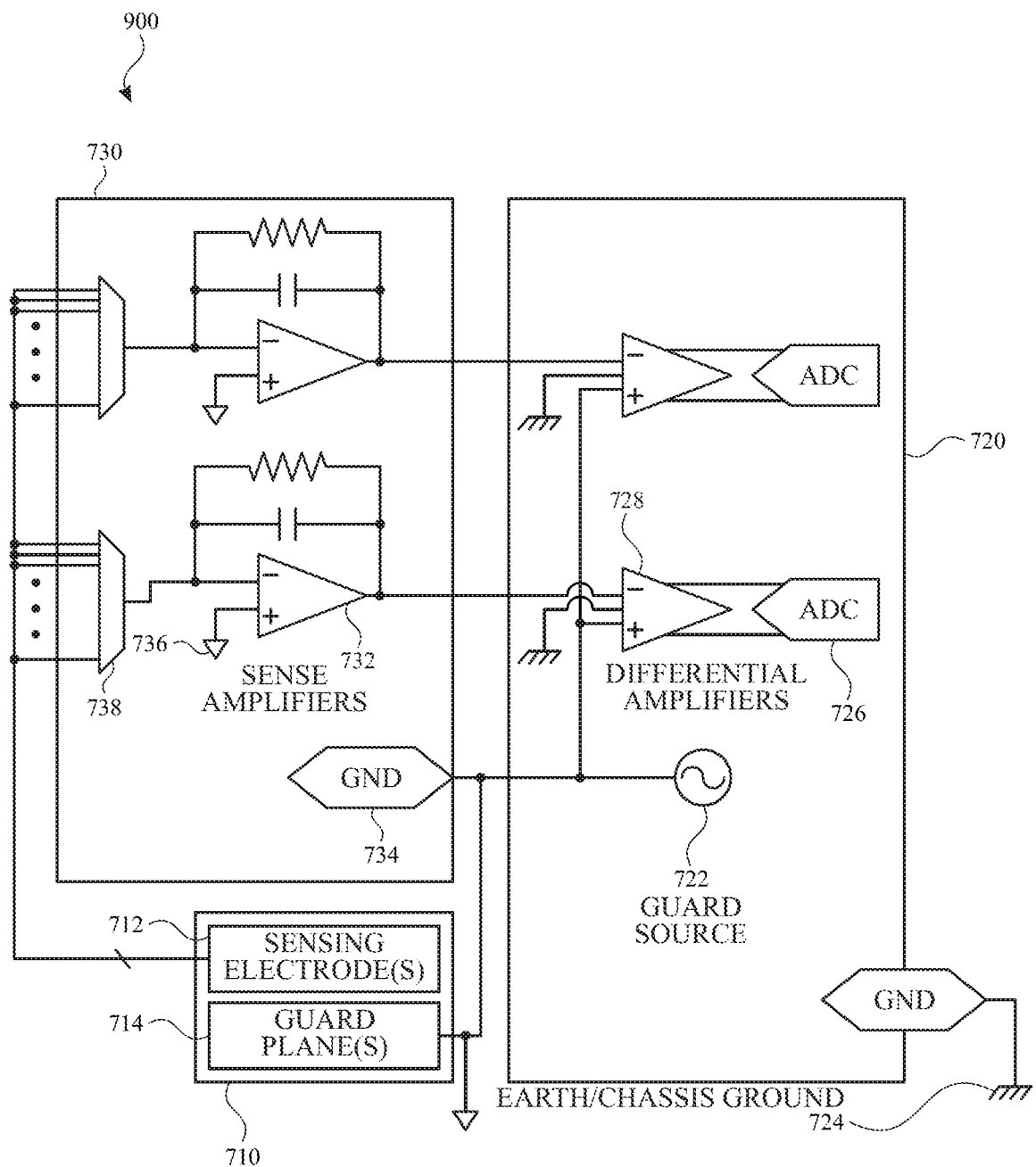
FIG. 7A illustrates an exemplary block diagram of a touch and/or proximity detection system according to examples of the disclosure.

As discussed herein, in some examples, touch sensing circuitry and guard circuitry (e.g., to generate a guard voltage) for a guarded touch sensor panel can be implemented with separate electronic chips or integrated circuits operating in multiple power domains. FIG. 7A illustrates an exemplary block diagram of a touch and/or proximity detection system 700 according to examples of the disclosure. In some examples, proximity detection system 700 can include a touch sensor panel 710 (e.g., implemented in touch screen 124, 126, 128, or 130), chassis or earth ground referenced touch sensing chip 720, and guard referenced touch sensing chip 730. Touch sensor panel 710 can include one or more touch node electrodes 712 (such as touch node electrode 608) and one or more guard planes 714 (such as guard plane 624A). In some examples, chassis or earth ground referenced touch sensing chip 720 can include voltage driver 722 (e.g., guard source 626), differential amplifiers 728, and analog-to-digital converters (ADCs) 726. Guard referenced touch sensing chip 730 can include one or more sense amplifiers 732 configured to be coupled to touch node electrodes 712 of touch sensor panel 710 (e.g., by switching circuitry such as multiplexers 738). In some examples, chassis or earth ground referenced touch sensing chip 720 can also include additional components such as a microcontroller (e.g., corresponding to touch processor 202 or touch controller 206), memory, filters (e.g., anti-aliasing filters), etc. In some examples, chassis or earth ground referenced touch sensing chip 720 can be referenced to earth or chassis ground 724 and guard referenced touch sensing chip 730 can be referenced to guard ground (e.g., via voltage driver 722.

Chassis or earth ground referenced touch sensing chip 720 can include voltage driver 722 configured to generate a guard voltage. In some examples, voltage driver 722 can be coupled to one or more guard planes 714 of touch sensor panel 710 and ground pin 734 of guard referenced touch sensing chip 730. In this way, guard referenced touch sensing chip 730 can "float" relative to earth or chassis ground 724, which can shield one or more components of touch circuitry from noise. For example, earth or chassis ground 724 can become capacitively coupled to a noise source (e.g., noise from display circuitry within the electronic device and/or a noise source external to the electronic device), which can be shielded by guarding. In some examples, chassis or earth ground referenced touch sensing chip 720 can further include one or more touch sensing components for touch sensing, such as differential amplifiers 728 and ADCs 726.

In some examples, one or more guard planes 714 can be located between touch node electrode 712 and display circuitry (not shown) included in an electronic device having touch and/or proximity detection system 700. Additionally or alternatively, the electronic device can include one or more guard planes in different locations (e.g., on the same layer as the touch node electrodes 712 or on a different layer between the touch node electrodes and a cover material (e.g., a cover glass) of the electronic device). In some examples, one or more guard planes 714 can be coupled to voltage driver 722 of chassis or earth ground referenced touch sensing chip 720 to receive a guard voltage (e.g., guard ground). Touch node electrode 712 can become capacitively coupled to an object proximate to or touching the touch sensor panel 710, for example.

Touch node electrode 712 can be coupled to the inverting input of sense amplifier 732, allowing sense amplifier 732 to sense one or more touch signals indicative of an object proximate to or touching the touch node electrode, for example. In some examples, each touch node electrode can have a corresponding sense amplifier (e.g., a 1:1 ratio between touch node electrodes and sense amplifiers) to enable simultaneous sensing of each touch node electrode in one scan step. The coupling between each touch node electrode corresponding sense amplifier can be hard wired or via switching circuitry. The switching circuitry can enable touch node electrodes to be stimulated and sensed (D/S configuration), stimulated without being sensed (D configuration) or grounded (G configuration) or otherwise held at a DC voltage. In some examples, the touch node electrodes 712 of touch sensor panel 710 can be coupled to sense amplifiers 732 through multiplexer 738 (or other switching circuitry). The switching capability can, in some examples, allow for fewer sense amplifiers (and thereby less circuitry) to be used to sense a touch sensor panel of a given size (in addition to providing different configurations (D/S, D or G configurations) for touch node electrodes). For example, a touch sensor panel with 1000 touch nodes can be sensed using 50 sense amplifiers in 20 scan steps. During each scan step different touch node electrodes can be coupled to the available sense amplifiers. In some examples, the non-inverting input of sense amplifier 732 can be coupled to virtual ground pin 736 referenced to the guard voltage generated by voltage driver 722. Although multiplexers 738 are illustrated in guard referenced touch sensing chip 730, in some examples, they may be implemented separately from guard referenced touch sensing chip 730 (e.g., in a different chip).

Although the block diagram of FIG. 7A includes only sense amplifiers and multiplexers implemented in the guarded domain, in other examples, a different distribution of touch sensing circuitry between the earth or chassis ground domain and the guarded domain is possible. For example, the differential ADCs and/or single-ended to differential conversion circuitry (e.g., differential amplifier 728) can be implemented in the guarded domain rather than the earth or chassis ground domain. The arrangement of FIG. 7A, however, can reduce the number of components in the guard domain, thereby reducing the components to be powered in the guarded domain (reducing the requirements for the power system for "floating" guard-domain power supplies). Additional details of powering circuitry in a system operating in two power domains are described in U.S. patent application Ser. No. 15/663,271 to Christoph H. KRAH et al. ("TOUCH SENSOR PANEL WITH MULTI-POWER DOMAIN CHIP CONFIGURATION"), which is herein incorporated by reference for all purposes. Additionally, by level shifting analog signals between the guard domain and the earth or chassis ground domain rather than digital signals, the level shifting burden can be reduced and/or interconnections between the two power domains can be reduced. Specifically, the level shifting can be performed on the single-channel analog output of sense amplifiers 732, rather than on the multi-channel output of ADC 726 (e.g., n bits/channel per ADC output).

The level shifting between the guarded domain and the earth or chassis ground domain can be achieved with differential amplifiers 728. In some examples, the non-inverting inputs of differential amplifiers 728 can be coupled to the guard voltage output by voltage driver 722 and the inverting input can receive the analog output from sense amplifier 732. In this way, the touch signals from sense amplifiers 732 can be level shifted from the virtual ground domain to the earth or chassis ground domain (e.g., by subtracted the guarded voltage contribution to the touch signal from the touch signal). The differential amplifiers 728 can be referenced to earth or chassis ground 724. In addition to level shifting, the differential amplifiers 728 can also convert the single-ended output of sense amplifiers 732 to differential signals. Additionally, the ADC can be referenced to earth or chassis ground 724. The differential ADC 726 can convert the differential output of differential amplifier 728 to a digital signal. Although analog circuitry is shown in FIG. 7A, additional digital signal processing can be included on the chassis or earth ground referenced touch sensing chip 720 (e.g., touch processor 202, touch controller 206). It should be understood that touch and/or proximity detection system 700 can divide touch signal processing between guard referenced touch sensing chip 730 and chassis or earth ground referenced touch sensing chip 720 in other ways than illustrated in FIG. 7A. Although illustrated as differential ADCs in FIG. 7A, it should be understood that a single-ended ADC can be used without single-ended to differential conversion of the output from sense amplifiers.

Guard referenced touch sensing chip 730 and chassis or earth ground referenced touch sensing chip 720 can be separate integrated circuit chips as illustrated in FIG. 7A. In some examples, both guard referenced touch sensing chip 730 and chassis or earth ground referenced touch sensing chip 720 can be implemented on a single integrated circuit chip. For example, the components of guard referenced touch sensing chip 730 can be placed in a deep well (e.g., n-well) to isolate circuitry operating in the guard domain from chassis or earth ground referenced touch sensing chip 720 and its associated circuitry operating in the chassis or earth ground domain. For example, sense amplifier 732 referenced to the guard voltage can be placed in a deep well to be isolated from guard driver 722 referenced to the chassis or earth ground domain.

Implementing the sense amplifier 732 (and optionally other circuitry) in a guard domain chip separate from other analog and/or digital circuitry can improve scalability for touch sensor panels of different sizes. For example, a touch and/or proximity detection system can include one chassis or earth ground referenced touch sensing chip 720 and multiple guard referenced touch sensing chips 730. The chassis or earth ground referenced touch sensing chip 720 can act as a master chip for multiple guard referenced touch sensing chips 730. Multiplexers (e.g., multiplexer 738) or other switching circuitry (e.g., separate from guard referenced touch sensing chips 720) can be used to couple some or all of the touch node electrodes of the touch sensor panel to sense amplifiers in the multiple guard referenced touch sensing chips 720. The number of guard referenced touch sensing chips 720 for a touch sensor panel can be a function of the size of the touch sensor panel and the number of sense channels in each guard referenced touch sensing chip 730. For example, when using a guard referenced touch sensing chip 730 including 20 sense channels (e.g., 20 sense amplifiers), two guard referenced touch sensing chips 730 can be used for a touch sensor panel including 40 touch node electrodes and ten guard referenced touch sensing chips 730 can be used for a touch sensor panel including 200 touch node electrodes. In some examples, chassis or earth ground referenced touch sensing chip 720 can include the same number of differential amplifiers and ADCs as each of the guard referenced touch sensing chips 730 (or a different number). For example, chassis or earth ground referenced touch sensing chip 720 can include switching circuitry (e.g., analog MUXs) which can be operated to couple the sense amplifiers 732 of guard referenced touch sensing chip 730 to differential amplifiers 728. Such a configuration can reduce the number of differential amplifiers and ADCs in chassis or earth ground referenced touch sensing chip 720 while maintaining the ability to interface with each of sense channels in guard referenced touch sensing chip 930.

In some examples, the differential amplifiers in the chassis or earth ground referenced touch sensing chip can receive the guard voltage by a trace in the chassis or earth ground referenced touch sensing chip. For example, as illustrated in FIG. 7A, the guard voltage generated in chassis or earth ground referenced touch sensing chip 720 can be supplied to differential amplifier 728 by a trace within chassis or earth ground referenced touch sensing chip 720. In some examples, the guard voltage generated in chassis or earth ground referenced touch sensing chip 720 can be supplied to differential amplifier 728 by a routing trace from the guard referenced touch sensing chip 730 to the chassis or earth ground referenced touch sensing chip 720. This arrangement can reduce phase drift between the guarded voltage supplied to one terminal of the differential amplifier and the touch signal suppled to the second terminal of the differential amplifier (e.g., by providing conductive paths of substantially the same length to carry both the touch signal and the guard signal). In some examples, the guard planes can sandwich the routing carrying touch signals forming a coaxial cable structure (e.g., carrying the guarded voltage to shield the inner conductive path carrying the guarded touch signal from one or more noise sources). The output from the guard referenced touch sensing chips can be transmitted to a master earth or chassis ground referenced touch sensing chip (e.g., with a guard voltage trace that also travels between the guard referenced touch sensing chip to the earth or chassis ground referenced touch sensing chip to reduce phase drift at the differential amplifiers in the earth or chassis ground referenced touch sensing chip.

Figure 7B:
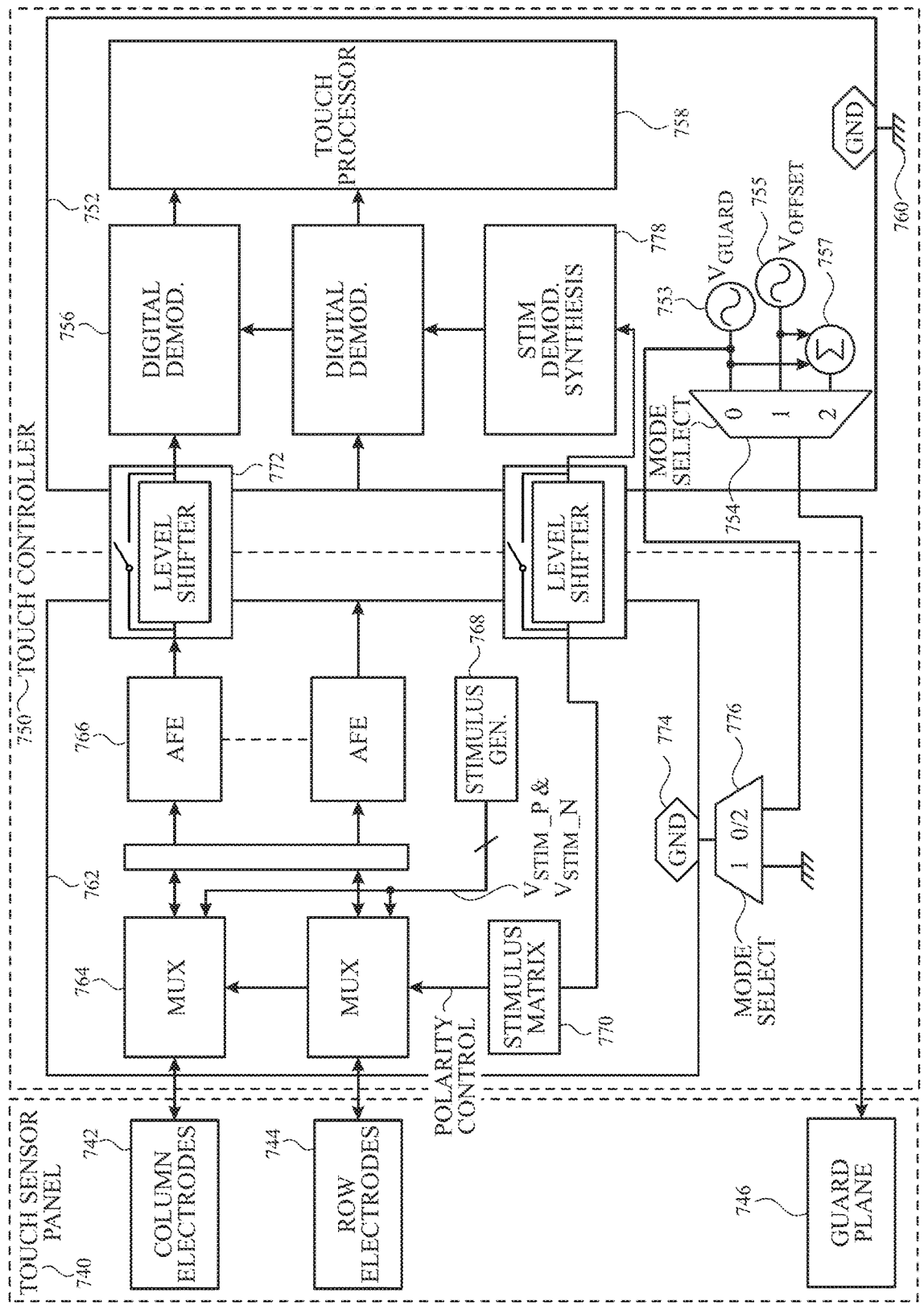
FIG. 7B illustrates an exemplary multi-modal touch controller configuration according to examples of the disclosure.

FIG. 7B illustrates an exemplary multi-modal touch controller configuration according to examples of the disclosure. In some examples, the multi-modal touch controller can be configured to perform guarded self-capacitance scans (in a first mode), offset compensated mutual capacitance scans (in a second mode) or both mutual and self-capacitance scans (in a third mode).

In a first mode (guarded self-capacitance mode), the multi-modal touch controller 750 can operate in a similar manner to the description above with respect to FIG. 7A. For example, the multi-modal touch controller 750 can be used in the first mode with a touch sensor panel 740 having column electrodes 742 and row electrodes 744 (e.g., as shown in touch screen 400) or can be used with individual touch node electrodes (e.g., as shown in touch screen 402). The touch sensor panel 740 can also include a guard plane 746 (e.g., disposed between the touch node electrodes and the display circuitry). The touch sensor panel can be substantially similar to the touch sensor panel 710 in FIG. 7A. The operation of multi-mode touch controller 750 can be divided into two touch sensing chips operating in two power domains like in the block diagram of FIG. 7A. However, unlike FIG. 7A which includes some analog touch sensing circuitry in the guarded domain and the remaining analog and digital touch sensing circuitry in the chassis or earth ground domain, touch controller 750 can including analog touch sensing circuitry in a touch sensing chip 762 in the guarded domain and digital touch sensing circuitry in a second touch sensing chip 752 in the chassis or earth ground referenced domain. However, aside from the different distribution of circuitry between the two chips, the operation of touch controller 750 in the first mode can be similar to the operation of chassis or earth ground referenced touch sensing chip 720 and guard referenced touch sensing chip 730. In particular, MUXs 764 (e.g., corresponding to MUXs 738) can couple analog touch sensing circuitry in analog front end (AFE) 766 (e.g., corresponding to sense amplifiers 732, ADCs 726, etc.) to touch node electrodes in touch sensor panel 740 (e.g., corresponding to touch sensor panel 740) to measure self-capacitances of the touch node electrodes. Touch sensing chip 752 can be referenced to chassis or earth ground and touch sensing chip 762 (including sensing amplifiers) can be referenced to a guard voltage generated by touch sensing chip 752 (e.g., the ground pin 774 of touch sensing chip 762 can be driven at the guard voltage by from guard source 753 in touch sensing chip 752). The panel guard 746 can be driven at the guard voltage by guard source 753. The guard source 753 can be selected for driving the guard ground for touch chip 762 and for driving guard plane 746 via multiplexers 754 and 776 (e.g., by selecting "Mode 0" corresponding to the first mode). The digital touch signal output by AFE 766 in touch sensing chip 762 can be transmitted to touch sensing chip 752 via level shifters 772 to shift the digital touch signals between the two power domains. The digital touch signal can be demodulated by demodulators 756 and the results can be processed by touch processor 758. It should be understood, however, that as in FIG. 7A, different distributions of the circuitry between touch sensing chip 752 and 762 are possible.

In a second mode (offset-compensated mutual-capacitance mode), touch controller 750 can operate in one power domain, with touch sensing chips 752 and 762 referenced to chassis or earth ground 760 (e.g., by coupling ground pins for touch sensing chips 752 and 762 to the chassis or earth ground 760). In some examples, the guard plane 746 can be driven at an offset voltage by the offset source 755 during the second mode. The offset source 755 can be selected for driving guard plane 746 and chassis or earth ground can be selected for driving the ground pin 774 for touch chip 762 via multiplexers 754 and 776 (e.g., by selecting "Mode 1" corresponding to the second mode). The offset voltage can be configured to compensate for (e.g., remove) background components of the sensed touch signal during a mutual capacitance scan. The remaining touch signal (which can be relatively small in magnitude compared with the background touch signal) can be representative of changes in capacitance due to objects touching or in proximity to touch nodes of touch sensor panel 740. Offset compensation for a mutual capacitance scan can allow for the dynamic range of the sense amplifiers in AFE 766 to be design for and used for the touch signal of interest, rather than for the background mutual capacitance between the column electrodes 742 and row electrodes 744.

In some examples, touch sensing chip 762 can include circuitry for multi-stimulation mutual capacitance measurements and touch sensing chip 752 can include circuitry for demodulation of touch signals from a multi-stimulation mutual capacitance scan. For example, touch sensing chip 762 can include a stimulus generator 768 (e.g., a transmit oscillator, digital logic, digital-to-analog converter (DAC), driver, etc.) configured to generate the stimulation signals to be applied to drive lines of touch sensor panel 740 and a stimulation matrix 770 configured to select stimulation voltages to be applied to different drive lines during different steps of a multi-stimulus mutual capacitance scan (e.g., a memory storing the parameters which can be represented as a matrix according to scan step and drive line). Stimulus voltages Vstim_p and Vstim_n designate, for example, drive signals at zero phase and 180° phase, respectively. Multiplexers 764 (or other switching circuitry) can couple the column electrodes 742 (or the row electrodes 744) to the stimulation voltages (generated by the stimulation generator 768 and selected in accordance with the stimulation matrix 770) and the row electrodes 744 (or the column electrodes 742) to AFEs to sense the mutual capacitance between the column electrodes 742 and row electrodes 746. Digital touch signals outputted from AFEs 766 can be level shifted by level shifters 772 from touch sensing chip 762 to touch sensing chip 752. In the second mode where both touch sensing chips 752 and 762 may be referenced to the same chassis or earth ground 760, the level shifting may simply be a transfer of digital touch signals between the two touch sensing chips. In such examples, the signals may simply bypass the level shifters 772 when touch sensing chips 752 and 762 (e.g., shown by bypass switch in the figure). Although level shifters 772 are illustrated as straddling between touch sensing chips 752 and 762 in FIG. 7B, it is understood that level shifters 772 can reside in either touch sensing chip 752 and/or in touch sensing chip 762 (or in a different location). The touch signals measured during the multiple steps of the multi-stimulation scan can be demodulated by digital demodulators 756 in touch sensing chip 752. The demodulation and decoding of the touch signals for touch nodes of touch sensor panel 740 can be based on the stimulation applied during each step (e.g., based on an inverse of the stimulation matrix and the output of the stimulation generator) as represented by stimulation demodulation synthesis circuit 778. The demodulated touch signals output by digital demodulators 756 can be further processed by the touch processor 758. Additional details of an exemplary multi-stimulation scan and multi-stimulation touch controller are described in U.S. patent application Ser. No. 11/619,433 to Steven P. HOTELLING et al. ("SIMULTANEOUS SENSING ARRANGEMENT") and U.S. patent application Ser. No. 12/283,423 to Steven P. HOTELLING et al. ("SINGLE-CHIP MULTI-STIMULUS SENSOR CONTROLLER"), which are herein incorporated by reference for all purposes. The multi-stimulation circuitry (e.g., stimulus generator 768, stimulus matrix 770, and stimulation demodulation synthesis circuit 778) can be activated during the second mode and deactivated during the first mode. Although a multi-stimulation mutual capacitance scan is described, in some examples, a single stimulation mutual capacitance scan can be implemented instead.

As described above, because the self-capacitance measurements of touch node electrodes can exhibit virtual mutual capacitance characteristics, the same touch sensing circuitry (e.g., AFEs) can be used for both mutual capacitance and self-capacitance sensing operations. Each of the AFEs 766 can include a sense amplifier and an analog-to-digital converter (ADC). The AFEs can also include additional components including filters, single-ended to differential conversion circuits, etc. In the first mode of operation, the non-inverting terminal of the sense amplifier can be guard referenced (e.g., as shown in FIG. 7A). In the second mode of operation, the non-inverting terminal of the sense amplifier can be chassis or earth ground referenced.

In some examples, touch sensing chip 752 can include guard source 753 and offset source 755 to generate the guard voltage and/or offset voltage depending on the mode of operation. The guard voltage or offset voltage can be selectively applied to guard plane 746 using multiplexer 754 and the guard voltage or chassis or earth ground can be selectively applied to touch sensing chip 762 using multiplexer 776 (or other switching circuitry).

In some examples, touch sensing chips 752 and 762 can be implemented as separate chips. In some examples, touch sensing chips 752 and 762 can be implement on the same ASIC. Deep N-well isolation can be used to prevent interference between the two sensing chips (in particular for when the two sensing chips 752 and 762 may be operating in different power domains).

FIG. 8A illustrates an exemplary scan plan and corresponding configurations for the multi-modal touch controller according to examples of the disclosure. The exemplary scan plan includes a spectral analysis scan ("SPA"), a multi-step mutual capacitance scan (N-step), a row self-capacitance scan, and a column self-capacitance scan. Each of these scans can be performed using a row-column touch screen of FIG. 4A. It is understood that the scan plan is exemplary, and in other cases fewer or more scans can be performed (e.g., mutual capacitance scans without self-capacitance scans or self-capacitance scans without mutual capacitance) and the order may be different (e.g., column self-capacitance first then row self-capacitance scans; self-capacitance scans before mutual capacitance scans, etc.). The exemplary scan plan can repeat once per display frame in some examples. During each scan, the touch sensing chip (e.g., touch sensing chip 762) can be referenced to a system ground (e.g., chassis or earth ground) or a guard voltage, and the guard plane for the touch sensor panel can be driven with a guard voltage, a voltage offset or a system ground as illustrated by and described above with reference to FIGS. 7A and 7B.

During a SPA scan, for example, the touch sensor panel can be sensed without stimulation. In such examples, the touch sensing chip (e.g., touch sensing chip 762) can be referenced to system ground. The guard plane for the touch sensor panel can also be grounded to system ground. During each scan step of the N-step mutual capacitance scan, the touch sensing chip (e.g., touch sensing chip 762) can be referenced to system ground. The drive lines of the touch sensor panel can be stimulated, for example, using multi-stimulation schemes by applying different stimulation voltages (e.g., Vstim+ and Vstim− having the same frequency and amplitude, but different phases). To achieve offset compensation, the guard plane for the touch sensor panel can be driven at an offset voltage during the mutual capacitance scan steps. During the row and/or self-capacitance scans, the touch sensing chip can be referenced to the guard voltage and the guard plane for the touch sensor panel can be driven at the guard voltage. Additionally, the stimulation applied to the row electrodes and/or column electrodes can be referenced to the guard voltage.

Referring back to the offset compensated mutual capacitance scan, in some examples, the first scan step of the multi-step mutual capacitance scan can be a common mode scan step in which each drive line is stimulated with the same stimulation voltage, Vstim_p (e.g., same frequency, phase and amplitude). In such examples, even without a proximate or touching object, a mutual capacitance proportional to N*Vstim would be detected for each sense line. As a result, for a common mode scan step the Voffset can be drive to −k*N*Vstim to counteract the effect of driving each mutual capacitance, where k can be a scalar compensating for the mismatch between the guard to sense line capacitance and the drive line to sense line capacitance. In some examples, the remaining scan steps of the multi-stimulation mutual capacitance scan can drive an equal number of drive lines with Vstim+ and Vstim− (e.g., same frequency and amplitude, but opposite phases). In such examples, the net offset can already be zero and thus Voffset can be zero or alternatively the guard plane can be grounded to system ground during these scan steps. Driving the guard plane for the panel to counteract the offset effects from driving multiple lines can compensate for the offset voltage from stimulation. The introduction of an offset voltage can increase the headroom of the sense amplifiers because the relevant headroom can be used for the touch signal post-offset compensation. Without offset compensation, the relatively large offset voltage (e.g., when compared with the size of a touch or proximity signal) can use up the bulk of the headroom, as well as reduce the sensitivity of the sensing amplifier to the small signal changes due to touch and/or proximity. Although the example above relies on a common mode mutual capacitance scan step followed by additional mutual capacitance scan steps (e.g., according to a Hadamard matrix), it is understood that other scan schemes are possible that may require different offset voltages at the guard plane (e.g., depending on the stimulation offset to be compensated for).

FIG. 8B describes a process 800 of touch sensing using a multi-modal touch controller according to examples of the disclosure. At 802, the system can determine the mode of operation for the touch controller. In some examples, the mode of operation can be a single mode of operation for a system and the multi-modal touch controller can be configured to operate according to that single mode of operation upon boot up of the system. Multi-modal touch controller can be used in such a system whether the single mode of operation is a self-capacitance mode or a mutual capacitance mode. In some examples, the mode of operation can change dynamically (e.g., according to a scan plan) and the determination of a touch sensing mode at 802 can be used to dynamically configure the multi-modal touch controller for operation in the desired mode of operation. In accordance with a determination that the mode of operation is a self-capacitance mode, the touch sensing chip (e.g., touch sensing chip 762) can be referenced to the guard voltage at 804 and the guard plane of the touch sensor panel can be driven with the guard voltage at 806. At 808, the touch node electrodes of the touch sensor panel can be stimulated and/or sensed relative to earth system ground using the guard voltage. In accordance with the determination that the mode of operation is a mutual capacitance mode, the touch sensing chip (e.g., touch sensing chip 762) can be referenced to the system ground at 810, the guard plane of the touch sensor panel can be driven with the offset voltage at 812, and the touch sensor panel can be stimulated, with reference to system ground (earth or chassis ground), with the multi-stimulation mutual capacitance touch sensing scheme at 814. In some examples, the multi-stimulation scheme can include two stimulation signals out of phase by 180 degrees (Vstim_p and Vstim_n) and during each scan an equal number of drive lines can be stimulated with either of the two stimulation signals. In such examples, the offset compensation can be zero (and, in some examples, may be omitted). In some examples, the same result can be achieved, but a first scan step of the mutual capacitance scan can be a common mode scan in which a non-zero offset can result. In such examples, an offset can be applied. In some examples, the offset voltage can be at different levels at different times during the mutual capacitance scan (e.g., difference scan steps), depending on the required voltage level to compensate for offsets.

Figure 9A:
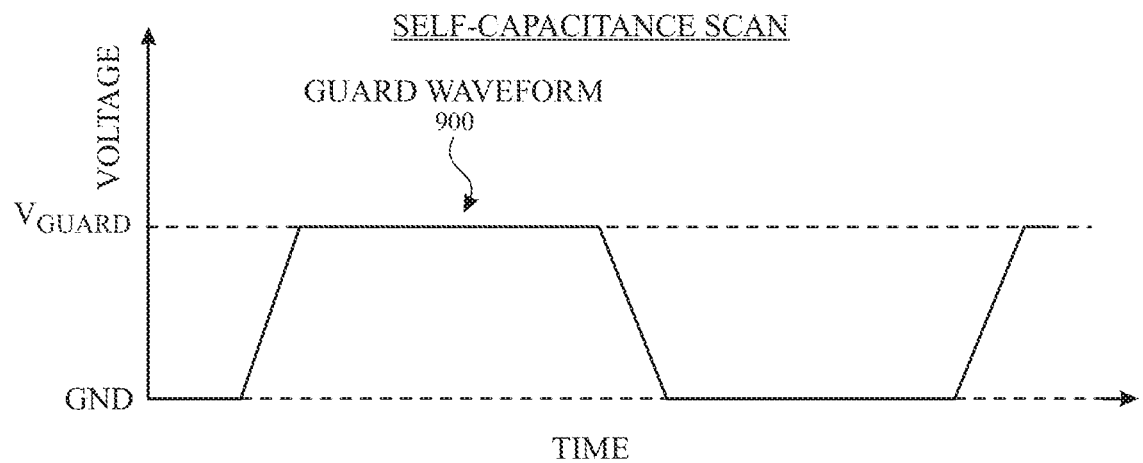
FIG. 9A illustrates an exemplary guard voltage waveform according to examples of the disclosure.

FIG. 9A illustrates an exemplary guard voltage waveform according to examples of the disclosure. The exemplary guard voltage waveform 900 can represent the amplitude of the output of MUX 776, for example, corresponding to the self-capacitance mode. The output of MUX 776 can be the guard voltage, which may be a trapezoidal periodic wave with amplitude Vguard. The guard voltage can toggle between a high value (GUARD HIGH) and a low value (GUARD LOW). Although illustrated in FIG. 9A as toggling between Vguard and system ground, the guard signal can toggle between +/−Vguard centered around system ground in other examples. The self-capacitance scans performed relative to the guard voltage can occur once the output of MUX 776 settles to the Vguard amplitude (rather than during the transitions of the guard voltage). Although the voltage transitions are illustrated in FIG. 9A as linear ramps, the transition can be non-linear.

Figure 9B:
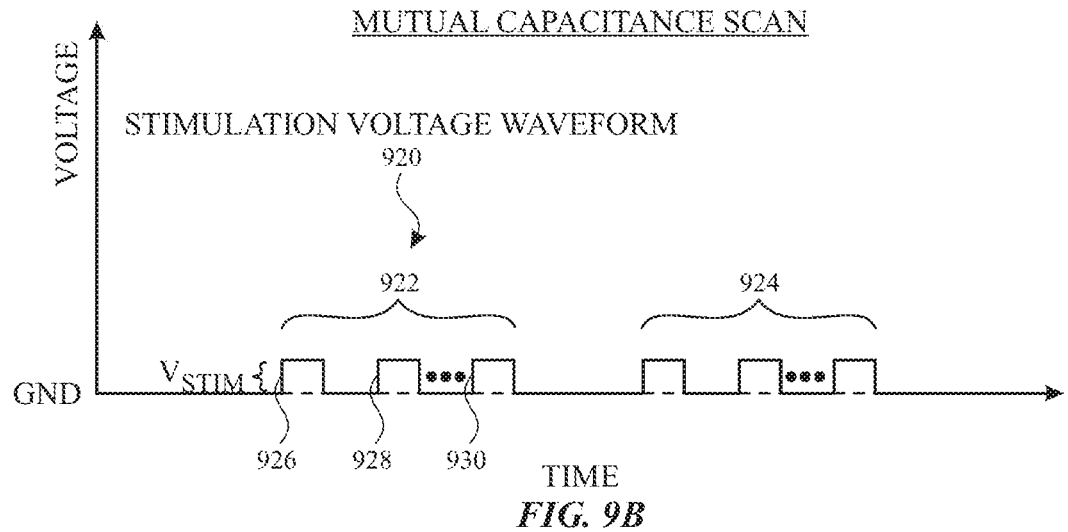
FIG. 9B illustrates an exemplary stimulation voltage waveform according to examples of the disclosure.

FIG. 9B illustrates an exemplary stimulation voltage waveform according to examples of the disclosure. The exemplary stimulation voltage waveform 920 can represent the amplitude of the drive signals to be applied to the drive lines during a mutual capacitance mode of multi-mode touch controller 750. At first time period 922 (e.g., corresponding to a first mutual capacitance scan of the touch sensor panel), the drive lines can be stimulated with stimulus according to the scan step (e.g., by stimulus generator 768 in accordance with the stimulation matrix 770). The amplitude of Vstim as shown can represent to application of Vstim_p or Vstim_n in multiple scan steps to multiple drive lines. Voffset can be used to counteract the offset according to the scan step. For example, during a first, common mode scan step corresponding to pulse 926, the offset voltage can be k*N*Vstim. During subsequent scan steps (e.g., corresponding to pulses 928 and 930) in which an equal number of drive lines can be stimulated with Vstim_p and Vstim_n, the offset voltage can be zero. In some examples, the offset voltage can be non-zero to account for mismatch between the guard to sense line capacitance and the drive line to sense line capacitance for each scan step. At second time period 924, a second mutual capacitance scan of the touch sensor panel can occur (or alternatively, additional scan steps of the mutual capacitance scan can occur).

As described above, in some examples, the multi-modal touch controller can be configured to operate in a third mode where both mutual and self-capacitance scans can be supported simultaneously. Referring back to FIG. 7B, in the third mode the touch sensing chip 762 can be referenced to the guard voltage by MUX 776 ("Mode 2") and the panel guard 746 can be drive by the combination of the guard voltage and the offset voltage by MUX 754. Referencing touch sensing chip 762 to the guard voltage and the guard plane 746 to the sum of the guard voltage and the offset voltage can achieve the guarding function for self-capacitance scans of a first portion of the touch sensor panel and the offset voltage function for the mutual capacitance scans of a second portion of the touch sensor panel.

Figures 8C, 8D:
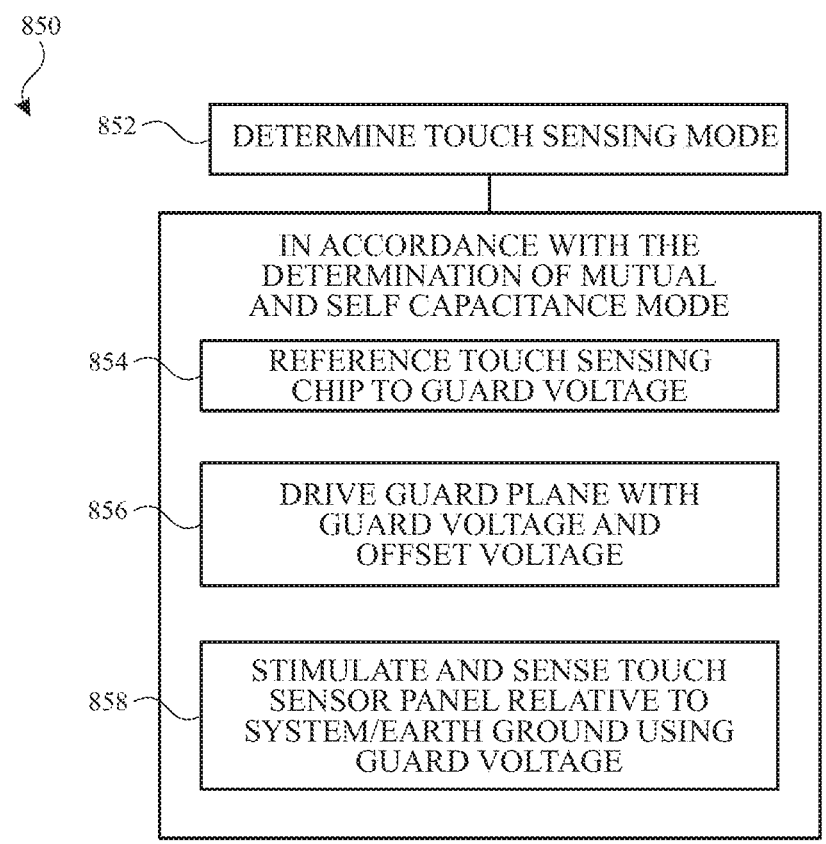
FIG. 8C illustrates an exemplary scan plan and corresponding configurations for the multi-modal touch controller according to examples of the disclosure.
FIG. 8D illustrates process of touch sensing using a multi-modal touch controller in a third mode according to examples of the disclosure.
Figure 11A:
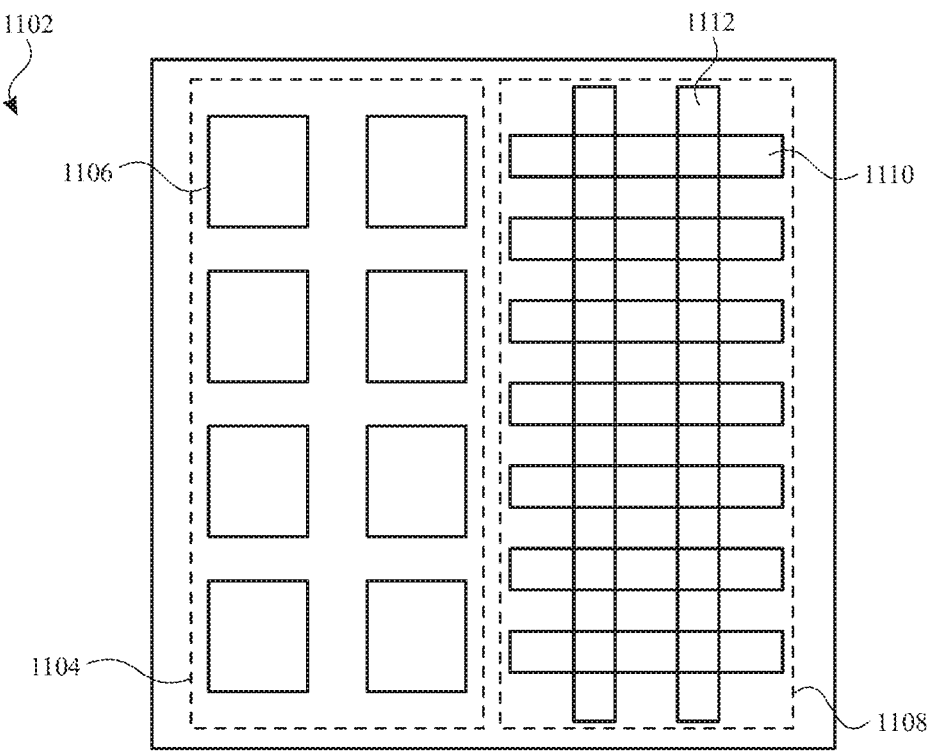
FIGS. 11A-11B illustrate exemplary touch sensor panels including a row and column electrode area and a touch node electrode area according to examples of the disclosure.
Figure 11B:
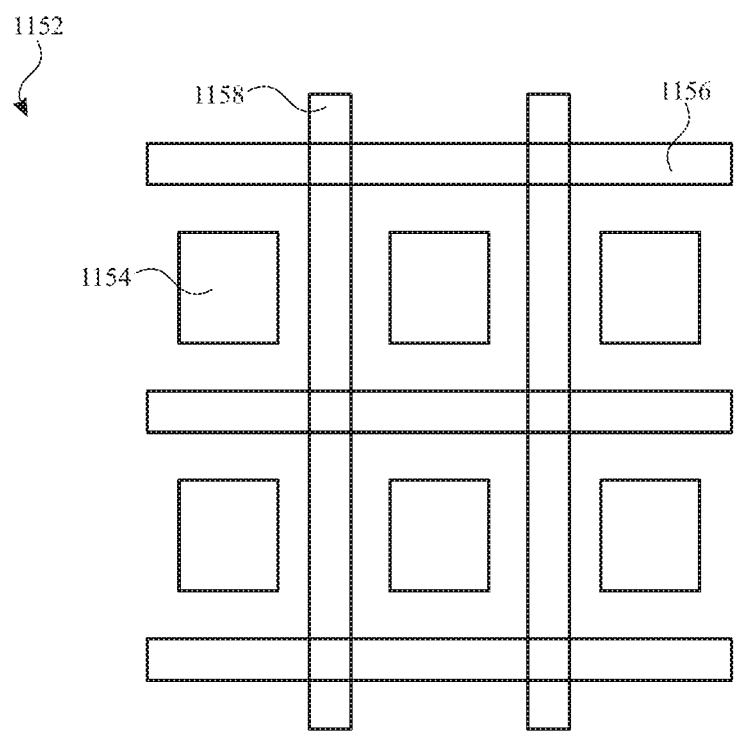

FIG. 8C illustrates an exemplary scan plan and corresponding configurations for the multi-modal touch controller according to examples of the disclosure. The exemplary scan plan includes a spectral analysis scan ("SPA"), and an at least partially overlapping multi-step mutual capacitance scan (N-step) and a self-capacitance scan (including one or more steps). The scans can be performed, for example, using a touch sensor panel including both row/column electrodes and touch node electrodes as illustrated in FIGS. 11A and 11B. It is understood that the scan plan is exemplary, and in other cases fewer or more scans can be performed and the order may be different. The exemplary scan plan can repeat once per display frame in some examples. During each scan, the touch sensing chip (e.g., touch sensing chip 762) can be referenced to a system ground (e.g., chassis or earth ground) or a guard voltage, and the guard plane for the touch sensor panel can be driven with a combination of the guard voltage and offset voltage.

The SPA scan can operate in the same manner as described above. During the mutual and self-capacitance scan, touch sensing chip (e.g., touch sensing chip 762) can be referenced to the guard voltage and the guard plane for the touch sensor panel can be driven at the guard voltage in superposition with the offset voltage. The drive lines of the touch sensor panel can be stimulated, for example, using multi-stimulation schemes by applying different stimulation voltages (e.g., Vstim+ and Vstim− having the same frequency and amplitude, but different phases). In this example, Vstim+ and Vstim− can be referenced to the guard voltage. Driving the guard plane for the touch sensor panel with the guard voltage and the offset voltage during the mutual capacitance scan steps can achieve offset compensation. The touch node electrodes of the touch sensor panel can also be stimulated and sensed at least partially simultaneously. The touch sensing chip can be referenced to the guard voltage and the guard plane can be driven by the guard voltage and offset voltage.

In some examples, Voffset can be zero during most scan steps of the mutual capacitance scan, and the self-capacitance scan can be performed during these scan steps so that the guard plane and touch sensing chip are both voltage guard referenced. In some examples, the self-capacitance scan can be performed even during the common mode scan steps of the mutual capacitance scans. In some examples, the guard plane can be divided into two guard planes one corresponding to the touch node electrodes and one corresponding to the row/column electrodes. In such a configuration, the guard plane corresponding to the row/column electrodes can be driven by the superposition of Voffset and the guard voltage, and the guard plane corresponding to the touch node electrodes can be driven by the guard voltage. In some examples, the guard voltage can be used to reference the touch sensing chip and to drive the guard voltage to stimulate the touch node electrodes. In such examples, the offset compensation can be omitted from the mutual capacitance sensing operations.

FIG. 8D illustrates process 850 of touch sensing using a multi-modal touch controller in a third mode according to examples of the disclosure. Process 850 can include the determination of a touch sensing mode at 852, which can correspond to 802 in process 800. In other words, process 850 can correspond to another branch added to process 800. In accordance with a determination that the mode of operation is a mutual and self-capacitance mode, the touch sensing chip (e.g., touch sensing chip 762) can be referenced to the guard voltage at 854, the guard plane of the touch sensor panel can be driven with the superposition of offset voltage at 856. At 858, a first portion of the touch sensor panel can be stimulated, relative to earth system ground using the guard voltage, with the multi-stimulation mutual capacitance touch sensing scheme at 858. At least partially simultaneously, a second portion of the touch sensor panel can be stimulated and sensed with a self-capacitance touch sensing scheme.

Figure 10A:
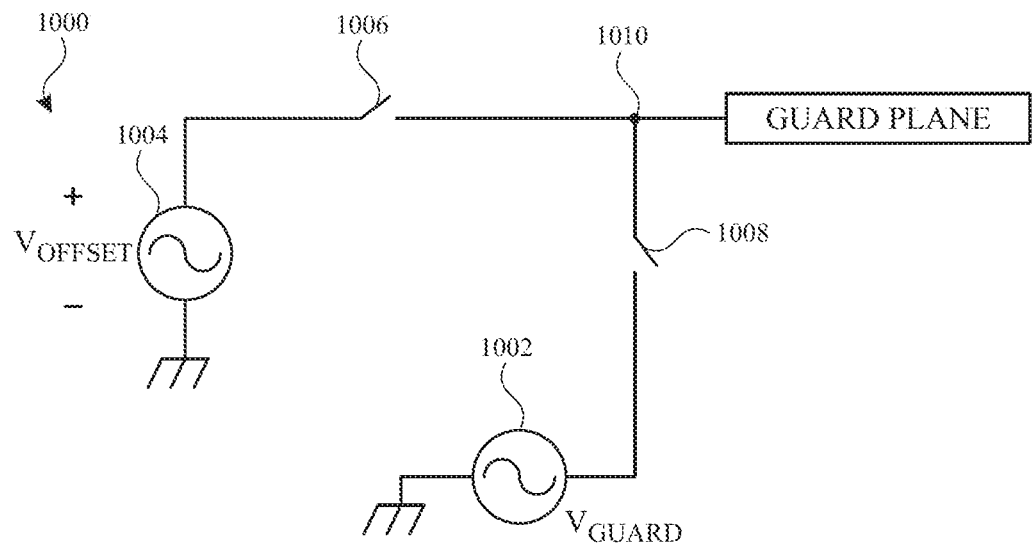
FIG. 10A illustrates an exemplary voltage generation circuit for a multi-modal touch controller according to examples of the disclosure.

FIG. 10A illustrates an exemplary voltage generation circuit for a multi-modal touch controller according to examples of the disclosure. The guard voltage generation circuit 1000 can include guard voltage driver 1002 and an offset voltage driver 1004. The circuit 1000 can also include switch 1006 and switch 1008 to generate the output voltage to be applied to the guard plane of the touch sensor panel (e.g., output from MUX 754). The guard voltage driver 1002 can also be used as a guard voltage reference for a touch sensing chip. During a self-capacitance mode, the guard voltage driver 1002 can provide a suitable guard voltage at output 1010 to be applied to guard plane 1012 of the touch sensor panel. During a mutual capacitance mode, the guard voltage driver 1002 can output the system ground voltage (or alternatively the guard voltage driver 1002 can be disabled and the output 1010 can be switchable coupled to system ground). In some examples, the output of guard voltage driver 1002 can couple to output 1010 via switch 1008 (e.g., with switch 1006 open). In some examples, when switch 1006 is closed and switch 1008 is open, the output 1010 can be the offset voltage (e.g., for a mutual capacitance scan). In some examples, when switch 1006 and switch 1008 are closed, output 1010 can be the sum of the offset voltage and the guard voltage. The sums of the voltages at the output 1010 can substantially follow the time varying behavior (e.g., ramping up or ramping down) of the guard voltage.

As described above, the offset voltage driver 1004 can couple to output 1010 via switch 1006 and the guard voltage driver can couple to output 1010 via switch 1008. In some examples, each switch can be a Schottky diode. In some examples, each of switches 1006 and 1008 can be implemented with a transistor driven by a control voltage that depends on the touch sensing mode. When the offset voltage is not required (e.g., in a self-capacitance mode), switch 1006 can open and the offset voltage driver 1004 may not contribute to voltage output 1010 (and may be disabled). When the offset voltage is required (e.g., in a mutual capacitance mode), switch 1006 can close and the offset voltage driver 1004 can contribute to voltage output 1010. Likewise, when guarding is required (e.g., in a self-capacitance mode or a mutual and self-capacitance mode), switch 1008 can be closed. When guarding is not required (e.g., in a mutual capacitance mode), switch 1008 can be opened. In some examples, the offset voltage output by offset voltage driver 1004 can be at different voltage levels at different times depending on the offset compensation required (e.g., for a given mutual capacitance scan step).

Although an exemplary circuit is shown in FIG. 10A, other combinations of different components can be used to generate guard voltages and/or offset voltages without departing from the scope of the present disclosure.

Figure 9C:
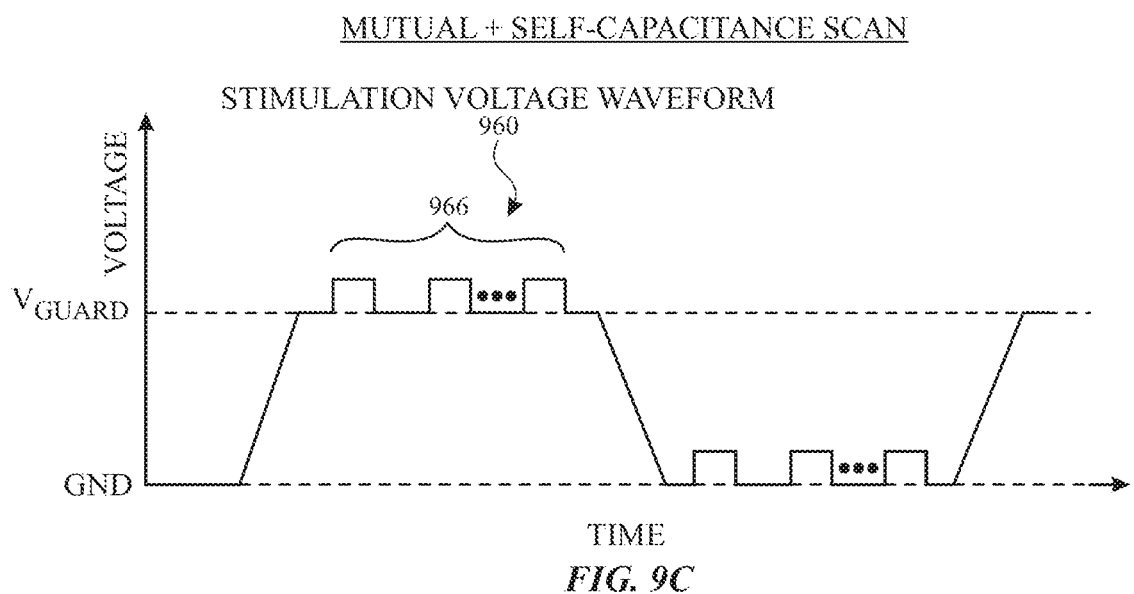
FIG. 9C illustrates an exemplary stimulation voltage waveform according to examples of the disclosure.

FIG. 9C illustrates an exemplary stimulation voltage waveform according to examples of the disclosure. The exemplary stimulation voltage waveform 960 can represent the amplitude of the drive signals applied to drive lines during a mutual and self-capacitance mode of multi-mode touch controller 750. Stimulation voltage waveform 960 can include elements from the mutual capacitance scan stimulation voltage waveform 920 superimposed over the guard voltage. The stimulation signals generated by touch sensing chip 762 can be referenced to the guard voltage rather to system ground as in a mutual capacitance mode. It should be understood that the guard voltage and superimposed stimulations shown in FIG. 9C is representative, and the relative amplitude, frequency, can be different between the guard voltage and the stimulation signals Vstim_p and Vstim_n (depending on the drive line and scan step), though the mutual and self-capacitance scans can avoid the transitions of the guard voltage and/or superimposed stimulation signals. Although the voltage transitions are illustrated as linear ramps or steps, the transition can be non-linear and other stimulation waveforms are possible.

Figure 10B:
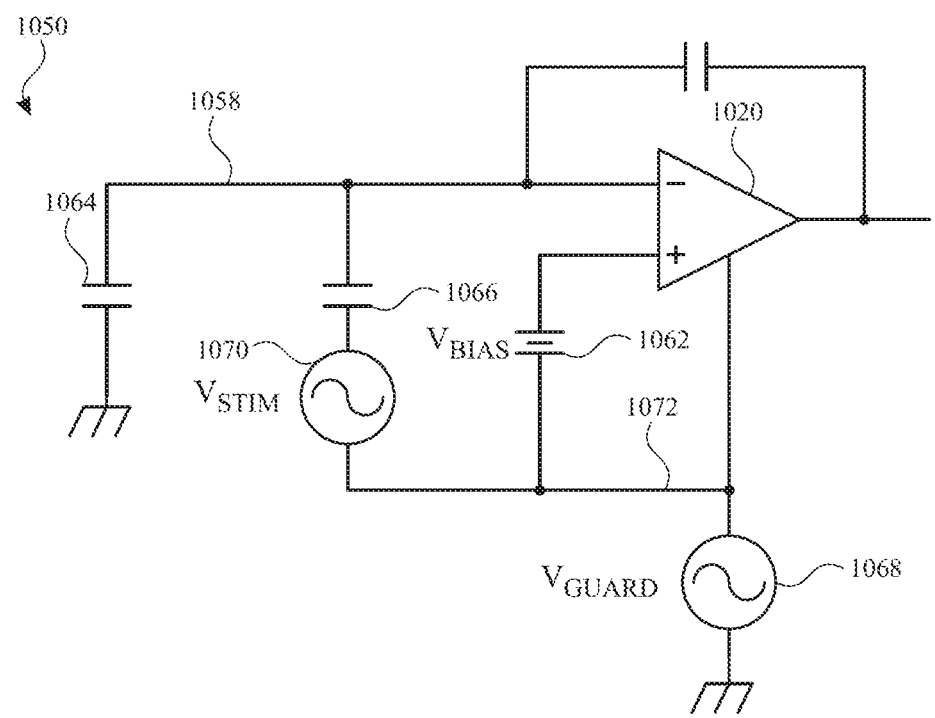
FIG. 10B illustrates an exemplary touch sensor panel configuration using guard voltage referenced touch sensing circuitry according to examples of the disclosure.

FIG. 10B illustrates an exemplary touch sensor panel configuration using guard voltage referenced touch sensing circuitry according to examples of the disclosure. For example, circuit 1050 can include touch sensing circuitry (e.g., sense amplifier 1020), which can be referenced to guard voltage 1068 for sensing touch on the touch sensor panel. Node 1058 of circuit 1050 can correspond to a touch node electrode of the touch sensor panel (or a sense line in a mutual capacitance configuration). A capacitance 1064 can represent a capacitance between a touch object (e.g., a finger of a chassis/earth grounded user) touching or proximate to the touch node electrode. Sense amplifier 1020 can referenced to a guard voltage generated by voltage source 1068. Voltage source 1062 can represent the bias voltage for sense amplifier 1020 relative to the guard ground of the touch sensing chip (node 1072). Capacitance 1066 can represent the capacitive coupling between one or more drive electrodes and the sense electrode (touch node electrode) during a mutual capacitance scan. During a mutual capacitance scan, guard-referenced stimulation can be applied by stimulation voltage source 1070 to drive lines. In this configuration, the stimulation voltage at drive electrodes can be similar to the waveform at time period 966.

Although the touch sensing methods described in this disclosure can be implemented on a touch sensor panel that includes row and column electrodes or touch node electrodes, as shown in FIGS. 4A and 4B, these touch sensing methods can be additionally or alternatively implemented on exemplary touch sensor panels shown in FIGS. 11A and 11B which include both row and column electrodes and individual touch node electrodes. For example, self-capacitance sensing of touch node electrodes can occur while mutual capacitance sensing the row and column electrodes. In other examples, the touch node electrodes and/or the row and column electrodes can be coupled to perform self-capacitance and/or mutual capacitance sensing.

In FIG. 11A, touch sensor panel 1102 can include one or more touch node electrode areas 1104 and one or more row and column electrode areas 1108. A touch node electrode area 1104 can include a plurality of touch node electrodes 1106. A row and column electrode area 1108 can include a plurality of row electrodes 1110 and column electrodes 1112. In one example, as illustrated, the touch sensor panel can be divided in half with one touch node electrode area 1104 and one row and column electrode area 1108. In other examples, the relative ratio of these areas can be different for the touch sensor panel. In FIG. 11B, touch sensor panel 1152 can include a plurality of touch node electrodes 1154, row electrodes 1156 and column electrodes 1158, where the touch node electrodes can be located in between the row electrodes 1156 and column electrodes 1158. It should be understood that other arrangements of touch node electrodes and row/column electrodes are possible for a touch sensor panel. For example, a plurality of touch node electrodes can be located in an opening between two rows and two columns. In some examples, one or more touch node electrodes can be located in some openings, but not others in a regular (e.g., every third "opening") or irregular pattern. In some examples, the touch sensor panel can include patterns incorporating both touch sensor panel 1102 and touch sensor panel 1152.

Figure 12:
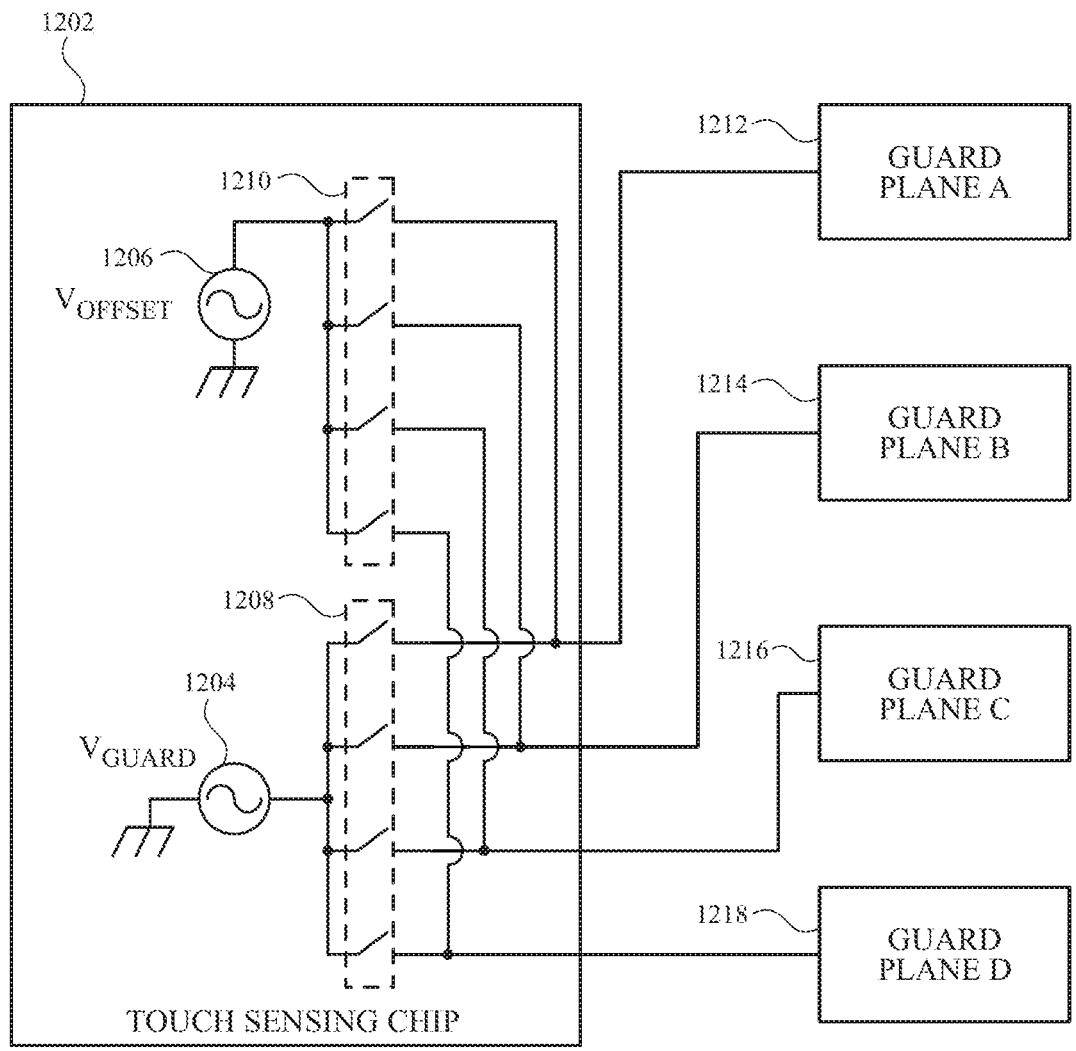
FIG. 12 illustrates an exemplary configuration including multiple guard planes for a touch sensor panel and multiple applied voltages according to examples of the disclosure.

As described herein, in some examples, the guard plane for a touch sensor panel can be divided into multiple guard planes. For example, a first guard plane can be used corresponding to touch node electrode area 1104 and a second guard plane can be used corresponding to row and column electrode area 1108. In such examples, the guard planes can be separately driven according to the mode of operation. FIG. 12 illustrates an exemplary configuration including multiple guard planes for a touch sensor panel and multiple applied voltages according to examples of the disclosure. For example, FIG. 12 illustrates touch panel guards 1212-1218 corresponding to the touch sensor panel (e.g., corresponding to different portions of the touch sensor panel). Each guard plane can be driven by touch sensing chip 1202, which can be referenced to system ground.

Touch sensing chip 1202 can include one or more guard voltage drivers 1204 and one or more offset voltage drivers 1206. One or more switches 1208/1210 can be used to couple one or more of the guard voltage drivers 1204 and/or one or more of the offset voltage drivers 1206 to respective touch panel guard planes 1212-1218. The switches 1208 and 1210 can be controlled to drive the guard planes with the appropriate voltage according to the touch sensing operation applied to the corresponding portion of the touch sensor panel.

Therefore, according to the above, some examples of the disclosure are directed to a touch sensing system. The touch sensing system can comprise: a first chip and a second chip. The first chip can be operating in a first power domain referenced to a first voltage. The first chip can be configured to generate a first signal in a first mode and a second signal in a second mode. The first signal can be different than the second signal. The second chip can be configurable to operate in a second power domain referenced to the first signal in the first mode and to operate in the first power domain referenced to the first voltage in the second mode. The second chip can include touch sensing circuitry configured to sense touch at one or more touch nodes of a touch sensor panel. Additionally or alternatively to one or more of the examples disclosed above, in some examples, the first mode can be a self-capacitance mode and the second mode can be a mutual capacitance mode. Additionally or alternatively to one or more of the examples disclosed above, in some examples, the first voltage can be a ground voltage of the touch sensing system. Additionally or alternatively to one or more of the examples disclosed above, in some examples, the first signal can be a guard voltage. Additionally or alternatively to one or more of the examples disclosed above, in some examples, the second signal can be an offset voltage. Additionally or alternatively to one or more of the examples disclosed above, in some examples, the touch sensing system can further comprise a guard plane associated with the touch sensor panel. The guard plane can be configured to be driven by the first signal in the first mode and to be driven by the second signal in the second mode. Additionally or alternatively to one or more of the examples disclosed above, in some examples, the first chip can be configured to generate a third signal based on the first signal and the second signal in a third mode. The second chip can be configurable to operate in the second power domain referenced to the first signal in the third mode. Additionally or alternatively to one or more of the examples disclosed above, in some examples, the third mode can be a mutual capacitance and self-capacitance mode. The touch sensing circuitry can comprise first sense amplifiers configured sense touch at one or more first touch nodes of the touch sensor panel in a mutual capacitance configuration and second sense amplifiers configured to sense touch at one or more second touch nodes of the touch sensor panel in a self-capacitance configuration. Additionally or alternatively to one or more of the examples disclosed above, in some examples, the guard plane can be configured to be driven by the third signal in the third mode. Additionally or alternatively to one or more of the examples disclosed above, in some examples, the touch sensor panel can include row electrodes and column electrodes forming the first touch nodes of the touch sensor panel. The touch sensor panel can include an array of touch node electrodes forming the second touch nodes of the touch sensor panel. Additionally or alternatively to one or more of the examples disclosed above, in some examples, the first chip and the second chip can be formed on one integrated circuit. The second chip can be isolated in a deep well from the first chip.

Some examples of the disclosure are directed to a method of touch sensing in a touch sensing system including a multimodal touch controller comprising a first chip operating in a first power domain referenced to a first voltage and a second chip. The method can comprise: determining a touch sensing mode; in accordance with a determination that the touch sensing mode is a first mode, the second chip can be operated in a second power domain referenced to the first signal; and in accordance with a determination that the touch sensing mode is a second mode, the second chip can be operated in the first power domain referenced to the first voltage. Additionally or alternatively to one or more of the examples disclosed above, in some examples, the first mode can be a self-capacitance mode and the second mode can be a mutual capacitance mode. Additionally or alternatively to one or more of the examples disclosed above, in some examples, the first voltage can be a ground voltage of the touch sensing system. Additionally or alternatively to one or more of the examples disclosed above, in some examples, the method can further comprise: in accordance with a determination that the touch sensing mode is the first mode, generating a first signal in the first chip; and in accordance with a determination that the touch sensing mode is the second mode, generating a second signal in the first chip. The first signal can be different than the second signal. Additionally or alternatively to one or more of the examples disclosed above, in some examples, the first signal can be a guard voltage. Additionally or alternatively to one or more of the examples disclosed above, in some examples, the second signal can be an offset voltage. Additionally or alternatively to one or more of the examples disclosed above, in some examples, the method can further comprise: in accordance with a determination that the touch sensing mode is the first mode, driving a guard plane of the touch sensing system with the first signal; and in accordance with a determination that the touch sensing mode is the second mode, driving the guard plane of the touch sensing system with the second signal. Additionally or alternatively to one or more of the examples disclosed above, in some examples, the method can further comprise: in accordance with a determination that the touch sensing mode is a third mode, operating the second chip in the second power domain referenced to the first signal. Additionally or alternatively to one or more of the examples disclosed above, in some examples, the method can further comprise: in accordance with a determination that the touch sensing mode is a third mode, generating a third signal in the first chip. Third signal can be a superposition of a first signal and a second signal generated in the first chip. Additionally or alternatively to one or more of the examples disclosed above, in some examples, the method can further comprise: in accordance with a determination that the touch sensing mode is the third mode, driving the guard plane of the touch sensing system with the third signal. Additionally or alternatively to one or more of the examples disclosed above, in some examples, the third mode can be a mutual capacitance and self-capacitance mode. Additionally or alternatively to one or more of the examples disclosed above, in some examples, the method can further comprise in accordance with a determination that the touch sensing mode is the third mode: sensing a first portion of a touch sensor panel of the touch sensing system in a mutual capacitance configuration to measure touch at one or more first touch nodes of the touch sensor panel; and sensing a second portion of the touch sensor panel of the touch sensing system in a self-capacitance configuration to measure touch at one or more second touch nodes of the touch sensor panel. Additionally or alternatively to one or more of the examples disclosed above, in some examples, the sensing of the first portion of the touch sensor panel and the sensing of the second portion of the touch sensor panel can occur at least partially concurrently. Some examples of the disclosure are directed to a non-transitory computer readable storage medium. The non-transitory computer readable storage medium can store instructions, which when executed by one or more processors of a touch sensing system including a multi-modal touch controller comprising a first chip operating in a first power domain referenced to a first voltage and a second chip, can cause the one or more processors to perform any of the above methods.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensing system comprising:
a first chip operating in a first power domain referenced to a first voltage, the first chip configured to generate and output a first signal in a first mode and a second signal in a second mode, the first signal different than the second signal and the second signal different from the first voltage, wherein the first chip is configured to output the first signal without outputting the second signal in the first mode and configured to output the second signal without outputting the first signal in the second mode; and
a second chip configurable to operate in a second power domain referenced to the first signal in the first mode and to operate in the first power domain referenced to the first voltage in the second mode, the second chip including touch sensing circuitry configured to sense touch at one or more touch nodes of a touch sensor panel.

2. The touch sensing system of claim 1, wherein the first mode is a self-capacitance mode and the second mode is a mutual capacitance mode.

3. The touch sensing system of claim 1, wherein the first voltage is a ground voltage of the touch sensing system.

4. The touch sensing system of claim 1, wherein the first signal is a guard voltage.

5. The touch sensing system of claim 1, wherein the second signal is an offset voltage.

6. The touch sensing system of claim 1, further comprising:
a guard plane associated with the touch sensor panel, the guard plane configured to be driven by the first signal in the first mode and to be driven by the second signal in the second mode.

7. The touch sensing system of claim 1, wherein the first chip is configured to generate a third signal based on the first signal and the second signal in a third mode;
wherein the second chip is configurable to operate in the second power domain referenced to the first signal in the third mode.

8. The touch sensing system of claim 7, wherein the third mode is a mutual capacitance and self-capacitance mode, wherein the touch sensing circuitry comprises first sense amplifiers configured sense touch at one or more first touch nodes of the touch sensor panel in a mutual capacitance configuration and second sense amplifiers configured to sense touch at one or more second touch nodes of the touch sensor panel in a self-capacitance configuration.

9. The touch sensing system of claim 8, wherein the touch sensor panel includes row electrodes and column electrodes forming the first touch nodes of the touch sensor panel and wherein the touch sensor panel includes an array of touch node electrodes forming the second touch nodes of the touch sensor panel.

10. The touch sensing system of claim 7, further comprising:
a guard plane associated with the touch sensor panel, wherein the guard plane is configured to be driven by the third signal in the third mode.

11. The touch sensing system of claim 1, wherein the first chip and the second chip are formed on one integrated circuit, wherein the second chip is isolated in a deep well from the first chip.

12. A method of touch sensing in a touch sensing system including a multi-modal touch controller comprising a first chip operating in a first power domain referenced to a first voltage and a second chip, the method comprising:
determining a touch sensing mode;
in accordance with a determination that the touch sensing mode is a first mode, generating and outputting a first signal from the first chip without outputting a second signal and operating the second chip in a second power domain referenced to the first signal generated in the first chip; and
in accordance with a determination that the touch sensing mode is a second mode, generating and outputting the second signal from the first chip without outputting the first signal and operating the second chip in the first power domain referenced to the first voltage;
wherein the first signal is different than the second signal and the second signal different from the first voltage.

13. The method of claim 12, wherein the first mode is a self-capacitance mode and the second mode is a mutual capacitance mode.

14. The method of claim 12, wherein the first voltage is a ground voltage of the touch sensing system.

15. The method of claim 12, wherein the first signal is a guard voltage.

16. The method of claim 12, wherein the second signal is an offset voltage.

17. The method of claim 12, further comprising:
in accordance with a determination that the touch sensing mode is the first mode, driving a guard plane of the touch sensing system with the first signal; and
in accordance with a determination that the touch sensing mode is the second mode, driving the guard plane of the touch sensing system with the second signal.

18. The method of claim 12, further comprising:
in accordance with a determination that the touch sensing mode is a third mode, operating the second chip in the second power domain referenced to the first signal.

19. The method of claim 18, further comprising:
in accordance with a determination that the touch sensing mode is a third mode, generating a third signal in the first chip, wherein the third signal is a superposition of the first signal and a second signal generated in the first chip.

20. The method of claim 19, further comprising:
in accordance with a determination that the touch sensing mode is the third mode, driving a guard plane of the touch sensing system with the third signal.

21. The method of claim 18, wherein the third mode is a mutual capacitance and self-capacitance mode.

22. The method of claim 21, further comprising:
in accordance with a determination that the touch sensing mode is the third mode:
sensing a first portion of a touch sensor panel of the touch sensing system in a mutual capacitance configuration to measure touch at one or more first touch nodes of the touch sensor panel; and
sensing a second portion of the touch sensor panel of the touch sensing system in a self-capacitance configuration to measure touch at one or more second touch nodes of the touch sensor panel.

23. The method of claim 22, wherein the sensing of the first portion of the touch sensor panel and the sensing of the second portion of the touch sensor panel occur at least partially concurrently.

24. A non-transitory computer readable storage medium storing instructions, which when executed by one or more processors of a touch sensing system including a multi-modal touch controller comprising a first chip operating in a first power domain referenced to a first voltage and a second chip, cause the one or more processors to perform a method comprising:
determining a touch sensing mode;
in accordance with a determination that the touch sensing mode is a first mode, generating and outputting a first signal from the first chip without outputting a second signal and operating the second chip in a second power domain referenced to the first signal generated in the first chip; and
in accordance with a determination that the touch sensing mode is a second mode, generating and outputting the second signal from the first chip without outputting the first signal and operating the second chip in the first power domain referenced to the first voltage;
wherein the first signal is different than the second signal and the second signal different from the first voltage.

25. The non-transitory computer readable storage medium of claim 24, further comprising:
in accordance with a determination that the touch sensing mode is the first mode, driving a guard plane of the touch sensing system with the first signal; and
in accordance with a determination that the touch sensing mode is the second mode, driving the guard plane of the touch sensing system with the second signal.

* * * * *